United States Patent
Omata et al.

(10) Patent No.: US 9,065,365 B2
(45) Date of Patent: Jun. 23, 2015

(54) CONTROL DEVICE OF AC MOTOR

(71) Applicant: DENSO CORPORATION, Kariya, Aichi-pref. (JP)

(72) Inventors: Ryuji Omata, Anjo (JP); Takeshi Itoh, Nagoya (JP); Hirofumi Kako, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 76 days.

(21) Appl. No.: 14/055,280

(22) Filed: Oct. 16, 2013

(65) Prior Publication Data
US 2014/0103844 A1  Apr. 17, 2014

(30) Foreign Application Priority Data
Oct. 16, 2012 (JP) .................................. 2012-228845

(51) Int. Cl.
*H02P 21/00* (2006.01)
*H02P 6/10* (2006.01)

(52) U.S. Cl.
CPC .......................................... *H02P 6/10* (2013.01)

(58) Field of Classification Search
CPC ....................................................... H02P 6/10
USPC ............. 318/400.01, 400.02, 400.14, 400.15, 318/400.22, 400.23, 700, 701, 721, 779, 318/799, 800, 801, 430, 432, 437; 388/800, 388/819, 823
See application file for complete search history.

(56) References Cited

U.S. PATENT DOCUMENTS

| | | | |
|---|---|---|---|
| 2008/0079385 A1 | 4/2008 | Hashimoto et al. | |
| 2011/0279071 A1* | 11/2011 | Yamada | 318/400.02 |
| 2013/0214709 A1 | 8/2013 | Omata et al. | |
| 2013/0214710 A1 | 8/2013 | Omata et al. | |
| 2013/0214711 A1 | 8/2013 | Omata et al. | |
| 2013/0214712 A1 | 8/2013 | Omata et al. | |
| 2013/0214713 A1 | 8/2013 | Omata et al. | |

FOREIGN PATENT DOCUMENTS

| | | |
|---|---|---|
| JP | 08-298796 | 11/1996 |
| JP | 2000-60196 | 2/2000 |
| JP | 2001-45779 | 2/2001 |
| JP | 2004-159391 | 6/2004 |

OTHER PUBLICATIONS

Office Action (2 pages) dated Sep. 18, 2014, issued in corresponding Japanese Application No. 2012-228845 and English translation (3 pages).

* cited by examiner

*Primary Examiner* — Antony M Paul
(74) *Attorney, Agent, or Firm* — Nixon & Vanderhye P.C.

(57) ABSTRACT

A control device for controlling an AC motor with an inverter includes: a current acquisition device of a sensor phase current sensed value of the motor in a sensor phase current sensing cycle; a rotation angle acquisition device of a rotation angle sensed value of the motor; a current command value operation device for updating a current command value in a command update cycle; a current estimation device; a voltage command value operation device; a drive signal generation device; and a sudden change prevention device for preventing the voltage command value from a sudden change according to a sudden change in the current estimated value. The sudden change of the current estimated value is caused by a sudden change in the current command value.

8 Claims, 17 Drawing Sheets

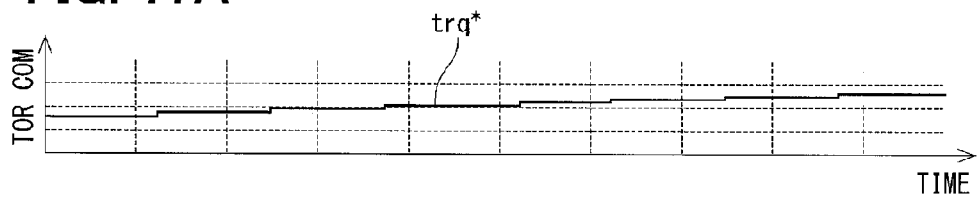
FIG. 17A
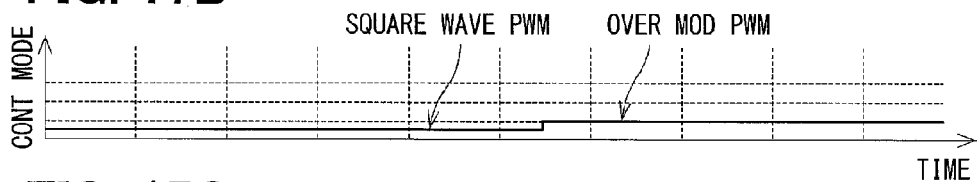
FIG. 17B
FIG. 17C
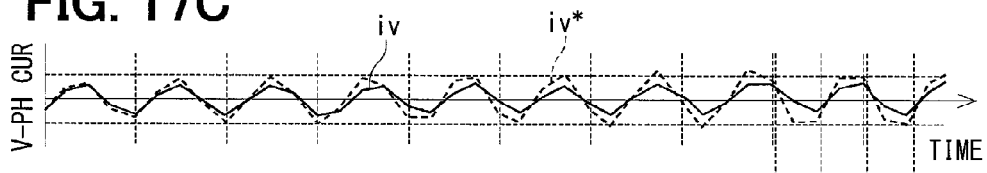
FIG. 17D
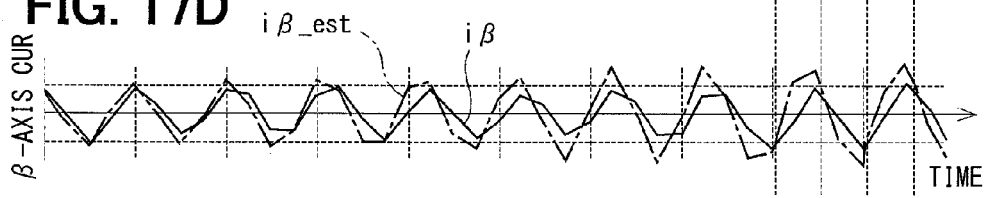
FIG. 17E
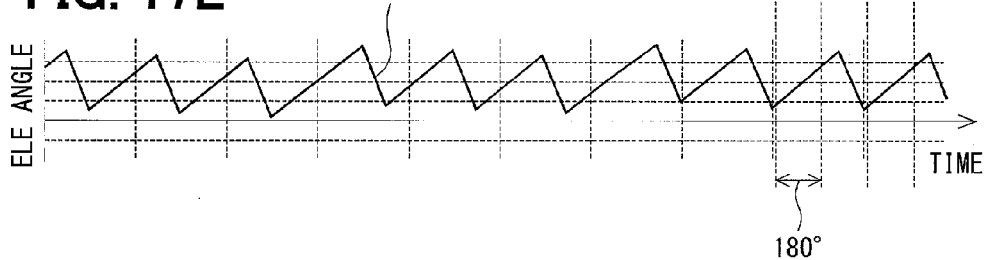

CONTROL DEVICE OF AC MOTOR

CROSS REFERENCE TO RELATED APPLICATION

This application is based on Japanese Patent Application No. 2012-228845 filed on Oct. 16, 2012, the disclosure of which is incorporated herein by reference.

TECHNICAL FIELD

The present disclosure relates to a control device of an alternating current (i.e., AC) motor.

BACKGROUND

In recent years, from the social requirement of lower fuel consumption and less exhaust emission, an electric automobile and a hybrid automobile, each of which is mounted with an AC motor as a power source of a vehicle, is drawing attention. For example, in some of the hybrid automobiles, a DC power source made of a secondary battery or the like and an AC motor are connected to each other via an electric power conversion device constructed of an inverter and the like, and the DC voltage of the DC power source is converted into AC voltage by the inverter to thereby drive the AC motor.

In the control device of the AC motor mounted in the hybrid automobile and the electric automobile like this, there is known the following technology: that is, a current sensor for sensing a phase current is disposed in only one phase to thereby decrease the number of current sensors, which reduces a space near three-phase output terminals of an inverter in dimension and hence reduces also the cost of a control system of the AC motor. In the case where the current sensor is disposed in only one phase, for example, in patent document 1, three-phase AC current command values are calculated on the basis of a current sensed value of the one phase (hereinafter referred to as "sensor phase") for sensing a phase current by means of the current sensor, a d-axis current command value and a q-axis current command value, and an electric angle of the AC motor and are estimated as current values of phases for each of which a current sensor is not disposed (hereinafter referred to as "estimated phase" as required).

For example, in the case where the control device of the AC motor is mounted in the hybrid automobile or the electric automobile as described above, when an accelerator pedal or a brake pedal is depressed, in some cases, a torque command value is suddenly changed by a user (man) request. Further, in the case of performing a traction control system for preventing a tire from being idled according to the state of a road surface or the like, in some cases, the torque command value is suddenly changed by a vehicle request. When the torque command value is suddenly changed, a d-axis current command value and a q-axis current command value, which are determined on the basis of the torque command, are also suddenly changed.

In an estimation method of the patent document 1, for example, in the case where the d-axis current command value and the q-axis current command value are suddenly changed, when the d-axis current command value and the q-axis current command value are used for estimating a current of an estimation phase for which the current sensor is not disposed as described above, a current estimated value of the estimation phase is also suddenly changed by a sudden change in the d-axis current command value and the q-axis current command value.

In particular, in the case where the update cycle of the d-axis current command value and the q-axis current command value is longer than an operation cycle of a voltage command value, when the current estimated values calculated on the basis of the d-axis current command value and the q-axis current command value in each of which an update cycle is long are fed back to thereby calculate a voltage command value, the voltage command value is also suddenly changed and hence voltage to be impressed on the AC motor is suddenly changed.

Further, depending on the type and construction of control, in some cases, current sensing by the current sensor is performed in a short cycle, and the update of the d-axis current command value and the q-axis current command value and the operation of a voltage command value by current feedback are performed in a longer cycle than a current sensing cycle by the current sensor. Even in the case where the current estimated value calculated on the basis of the current command value is fed back and the voltage command value is calculated in a slow cycle, a variation range of the voltage command value is increased by a sudden change in the current command value and hence when the voltage command value is updated, voltage to be impressed on the AC motor is likely to be suddenly changed.

When the voltage to be impressed on the AC motor is suddenly changed, an excessive overshoot or undershoot is caused in the output torque outputted from the AC motor and hence a desired torque cannot be outputted, which hence could make the drive control of the AC motor unstable. However, the patent document 1 does not take any countermeasure for the case where the d-axis current command value and the q-axis current command value are suddenly changed in this manner.

[Patent document 1] JP-A-2008-86139 (corresponding to US 2008/0079385)

SUMMARY

It is an object of the present disclosure to provide a control device of an AC motor that can drive the AC motor stably even in the case where a current sensor is disposed in only one phase and where a current command value is suddenly changed.

According to an aspect of the present disclosure, a control device for controlling a driving state of a three-phase alternating current motor, in which a voltage to be applied to the motor is controlled by an inverter, the control device includes: a current acquisition device for acquiring a sensor phase current sensed value in a sensor phase current sensing cycle from a current sensor disposed in a sensor phase, which is one of three phases of the alternating current motor; a rotation angle acquisition device for acquiring a rotation angle sensed value from a rotation angle sensor for sensing a rotation angle of the alternating current motor; a current command value operation device for updating a current command value relating to the driving state of the alternating current motor in a command update cycle, which is longer than the sensor phase current sensing cycle; a current estimation device for calculating a current estimated value according to the sensor phase current sensed value, the rotation angle sensed value, and the current command value; a voltage command value operation device for calculating a voltage command value according to the current command value and the current estimated value that is fed back; a drive signal generation device for generating a drive signal relating to a driving state of the inverter according to the voltage command value; and a sudden change prevention device for preventing the voltage command value from a sudden change according to a sudden change in the current estimated value that is fed back. The sudden change of the current estimated value is caused by a sudden change in the current command value. The sudden change of the voltage command value is defined by a change period equal to or shorter than a predetermined time interval, and a change amount equal to or larger than a predetermined change amount. The sudden change of the current estimated value is defined by a change period equal to or shorter than a predetermined time interval, and a change amount equal to or larger than a predetermined change amount. The sudden change in the current command value is defined by a change period equal to or shorter than a predetermined time interval, and a change amount equal to or larger than a predetermined change amount.

In the above control device, the inverter is driven on the basis of the drive signal to thereby generate three-phase AC voltages. Further, the generated three-phase AC voltages are impressed on the AC motor, whereby the AC motor is driven.

In the above control device, the current sensor is disposed in only one phase and the current estimated value that is fed back is calculated on the basis of the sensor phase current sensed value, the rotation angle sensed value, and the current command value, and the drive of the AC motor is controlled on the basis of the current estimated value and the like. In this way, the number of the current sensors can be reduced. By reducing the number of the current sensors, parts near three-phase output terminals of the inverter can be reduced in size and the cost of the control device of the AC motor can be reduced.

Further, the current command value is calculated on the basis of a higher command value, for example, a torque command value or the like, so that when the update cycle of the higher command value is long, the update cycle of the current command value is also long. Further, the higher command value of the torque command value or the like may be suddenly changed in some cases by an external factor, for example, user's depressing an accelerator pedal. In this case, the current command value is also suddenly changed. On the other hand, the sensor phase current sensed value and the rotation angle sensed value are values, which are short in the update cycle and are based on the actual behavior of the AC motor, and hence are continuously changed under normal conditions. The current estimated value is calculated on the basis of information which are different from each other in quality such as the update cycle, that is, on the basis of the current command value, which is long in the update cycle, and the sensor phase current sensed value and the rotation angle sensed value, which are short in the update cycle. As described above, since the current command value which is long in the update cycle is used for calculating the current estimated value that is fed back, the voltage command value is likely to be suddenly changed by a sudden change in the current command value.

Hence, the above control device includes the sudden change prevention means for preventing the voltage command value from being suddenly changed by a sudden change in the current estimated value that is fed back, the sudden change being caused by a sudden change in the current command value. In this way, since the voltage command value is prevented from being suddenly changed, even in the case where the current command value is suddenly changed, the voltage to be impressed on the AC motor can be prevented from being suddenly changed. Hence, the AC motor can be stably driven.

BRIEF DESCRIPTION OF THE DRAWINGS

The above and other objects, features and advantages of the present disclosure will become more apparent from the following detailed description made with reference to the accompanying drawings. In the drawings:

FIGS. 17A to 17E are charts to illustrate a V phase current and a β-axis current in the case where a torque command value is suddenly changed.

DETAILED DESCRIPTION

Hereinafter, a control device of an AC motor for controlling the drive of the AC motor according to the present invention will be described with reference to the drawings. Hereinafter, in a plurality of embodiments, the substantially same constructions are denoted by the same reference symbols and their descriptions will be omitted.

First Embodiment

Figure 1:
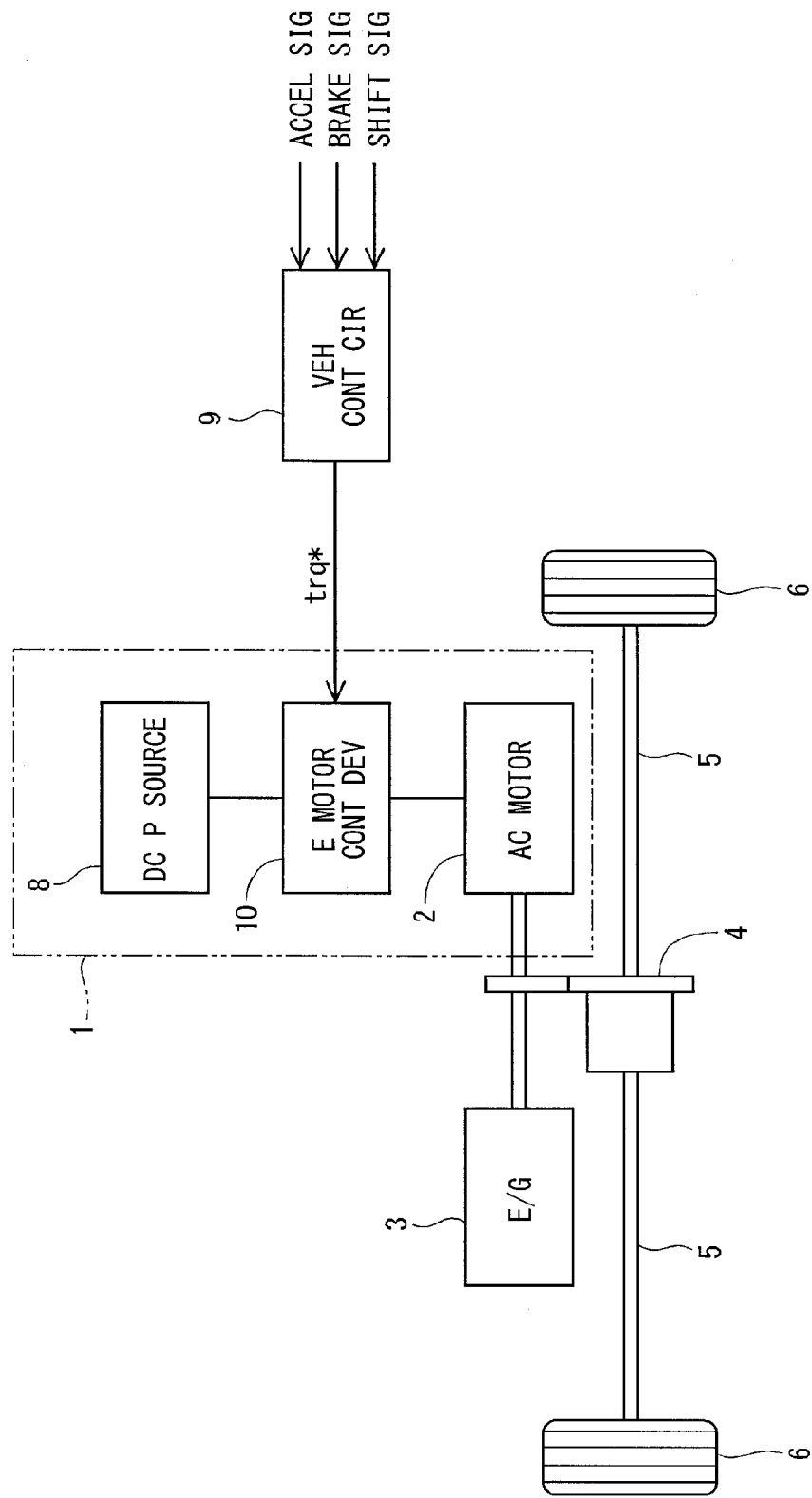
FIG. 1 is a schematic view to show a construction of an electric motor drive system of a first embodiment of the present invention.

As shown in FIG. 1, an electric motor control device 10 as a control device of an AC motor 2 according to a first embodiment of the present invention is applied to an electric motor drive system 1 for driving an electric vehicle.

The electric motor drive system 1 includes the AC motor 2, a DC power source 8, the electric motor control device 10, and the like.

The AC motor 2 is, for example, an electric motor for generating torque for driving the driving wheels 6 of the electric vehicle. The AC motor 2 of the present embodiment is a three-phase permanent magnet type synchronous motor.

It is assumed that the electric vehicle includes a vehicle for driving the driving wheels 6 by electric energy such as a hybrid automobile, an electric automobile, and a vehicle powered by a fuel battery. The electric vehicle of the present embodiment is a hybrid vehicle provided with an engine 3, and the AC motor 2 is a so-called motor generator (designated by "MG" in the drawing) having a function as an electric motor that generates torque for driving the driving wheels 6 and a function as a generator that is driven by the engine 3 and that can generate electricity.

The AC motor 2 is coupled to an axle 5 via a gear 4. In this way, the torque generated by the drive of the AC motor 2 rotates the axle 5 via the gear 4 to thereby drive the driving wheels 6.

The DC power source 8 is an electric storage device that can charge and discharge, for example, a secondary battery such as a nickel metal hydride battery or a lithium ion battery, and an electric double-layer capacitor. The DC power source 8 is connected to an inverter 12 (see FIG. 2) of the electric motor control device 10, that is, the DC power source 8 is so constructed as to supply electricity to the AC motor 2 and to be supplied with electricity from the AC motor 2 via the inverter 12.

A vehicle control circuit 9 is constructed of a microcomputer and the like and is provided with a CPU, a ROM, an I/O and a bus line for connecting these constructions, all of which are not shown in the drawings. The vehicle control circuit 9 controls the whole of the electric vehicle by a software processing, which is performed by executing previously stored programs by the CPU, and by a hardware processing, which is performed by a dedicated electronic circuit.

The vehicle control circuit 9 is so constructed as to be able to acquire signals from various kinds of sensors and switches such as an accelerator signal from an accelerator sensor, a brake signal from a brake switch, and a shift signal from a shift switch, all of which are not in the drawings. Further, the vehicle control circuit 9 detects a driving state of the vehicle on the basis of the acquired signals and outputs a torque command value trq* responsive to the driving state to the electric motor control device 10. Still further, the vehicle control circuit 9 outputs a command signal to an engine control circuit (not shown) for controlling the drive of the engine 3.

Figure 2:
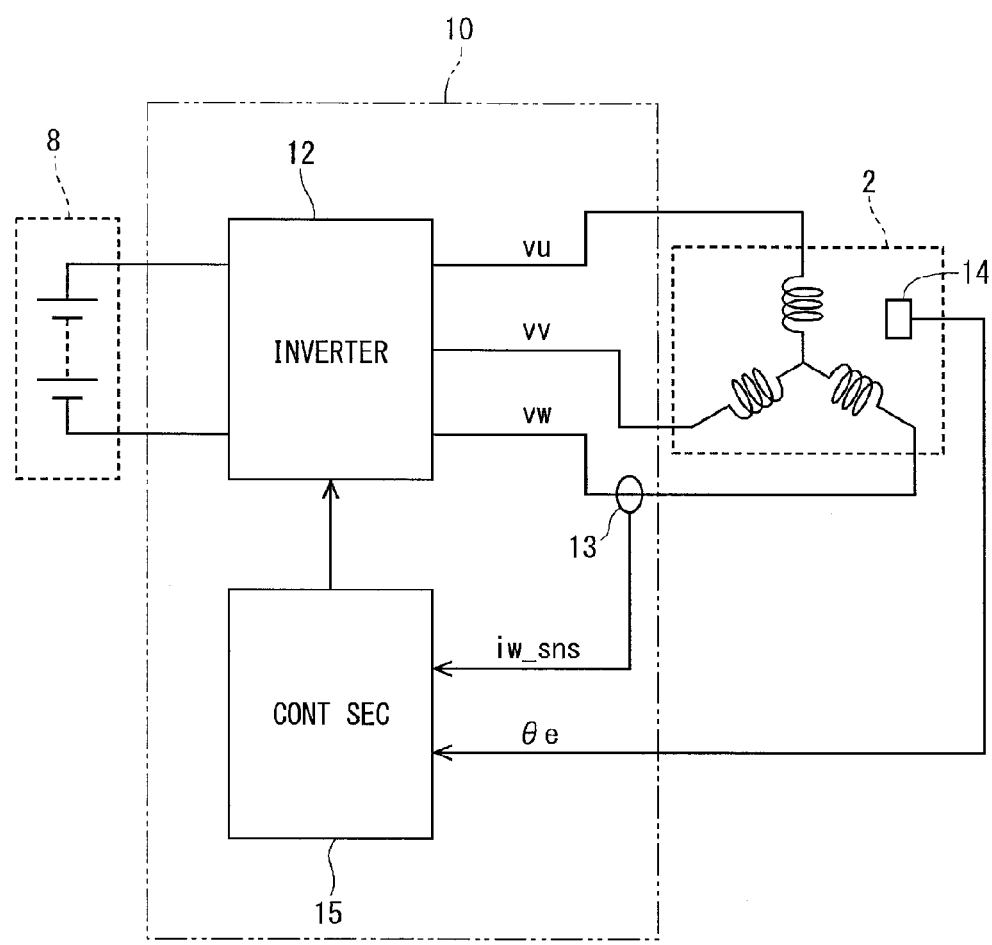
FIG. 2 is a schematic view to show a construction of an electric motor control device of the first embodiment of the present invention.

As shown in FIG. 2, the electric motor control device 10 is provided with the inverter 12 and a control section 15.

The inverter 12 has a system voltage VH impressed thereon according to the driving state of the AC motor 2, a vehicle request, and the like, the system voltage VH being a voltage to which the DC voltage of the DC power source 8 is boosted up by a boost converter (not shown). Further, the inverter 12 has six switching elements (not shown) connected in a bridge mode. As to the switching element, for example, an IGBT (Insulated Gate Bipolar Transistor), a MOS (Metal Oxide Semiconductor) transistor, and a bipolar transistor can be used for the switching elements. The switching elements are switched on/off on the basis of PWM signals UU, UL, VU, VL, WU, WL outputted from a PWM signal generation part 25 (see FIG. 3) of the control section 15. In this way, the inverter 12 controls three-phase AC voltages vu, w, vw that are to be impressed on the AC motor 2. The AC motor 2 has its drive controlled by the three-phase AC voltages vu, w, vw impressed thereon, the three phase AC voltages vu, w, vw being generated by the inverter 12.

Here, the drive control of the AC motor 2 will be described. According to the number of revolutions N of the AC motor 2, which is based on an electric angle θe sensed by a rotation angle sensor 14, and the torque command value trq* from the vehicle control circuit 9, the electric motor control device 10 drives the AC motor 2 as an electric motor to perform a powering operation, thereby consuming electricity, or drives the AC motor 2 as a generator to perform a regenerating operation, thereby generating electricity. Specifically, according to the number of revolutions N and to whether the command value trq* is plus or minus, the electric motor control device 10 switches the operation of the AC motor 2 into the following four patterns:

<1. Normal Rotation/Powering Operation>when the Number of revolutions N is plus and the torque command trq* is plus, the AC motor 2 consumes electricity;

<2. Normal rotation/regenerating operation>when the number of revolutions N is plus and the torque command trq* is minus, the AC motor 2 generates electricity;

<3. Reverse rotation/powering operation>when the number of revolutions N is minus and the torque command trq* is minus, the AC motor 2 consumes electricity; and <4. Reverse rotation/regenerating operation>when the number of revolutions N is minus and the torque command trq* is plus, the AC motor 2 generates electricity.

In the case where the number of revolutions N>0 (normal rotation) and the torque command trq*>0, or the number of revolutions N<0 (reverse rotation) and the torque command trq*<0, the inverter 12 converts the DC electricity supplied from the DC power source 8 to AC electricity by the switching operation of the switching element and supplies the AC electricity to the AC motor 2, thereby driving the AC motor 2 in such a way as to output torque (perform a powering operation).

On the other hand, in the case where the number of revolutions N>0 (normal rotation) and the torque command trq*<0, or the number of revolutions N<0 (reverse rotation) and the torque command trq*>0, the inverter 12 converts the AC electricity generated by the AC motor 2 to DC electricity by the switching operation of the switching elements and supplies the DC electricity to the DC power source 8, whereby the AC motor 2 performs a regenerating operation.

A current sensor 13 is disposed in any one phase of the AC motor 2. In the present embodiment, the current sensor 13 is disposed in a W phase. Hereinafter, the W phase having the current sensor 13 disposed therein is referred to as "a sensor phase". The current sensor 13 senses a sensor phase current sensed value iw_sns, which is passed through the W phase of a sensor phase, and outputs the sensor phase current sensed value iw_sns to the control section 15. In this regard, in the present embodiment, the current sensor 13 is disposed in the W phase but may be disposed in any one of phases. Hereinafter, in the description of the present embodiment, the description will be made on the assumption of a construction such that the sensor phase is the W phase. However, in the other embodiment, a U phase or a V phase may be made the sensor phase.

The rotation angle sensor 14 is disposed near a rotor (not shown) of the AC motor 2 and senses an electric angle θe and outputs the sensed electric angle θe to the control section 15. Further, the number of revolutions N is calculated on the basis of the electric angle θe sensed by the rotation angle sensor 14.

The rotation angle sensor 14 of the present embodiment is a resolver. In addition, the rotation angle sensor 14 may be an other kind of sensor such as a rotary encoder.

The sensor phase current sensed value iw_sns sensed by the current sensor 13 and the electric angle θe sensed by the rotation angle sensor 14 are updated in a short cycle (sensor phase current sensing cycle Cs to be described later) and is a value based on an actual behavior of the AC motor 2 and hence is continuously varied under normal conditions.

The control section 15 is constructed of a microcomputer and the like and is provided with a CPU, a ROM, an I/O and a bus line for connecting these constructions, all of which are not shown in the drawings. The control section 15 controls the operation of the AC motor 2 by a software processing, which is performed by executing previously stored programs by the CPU, or by a hardware processing, which is performed by a dedicated electronic circuit.

Figure 3:
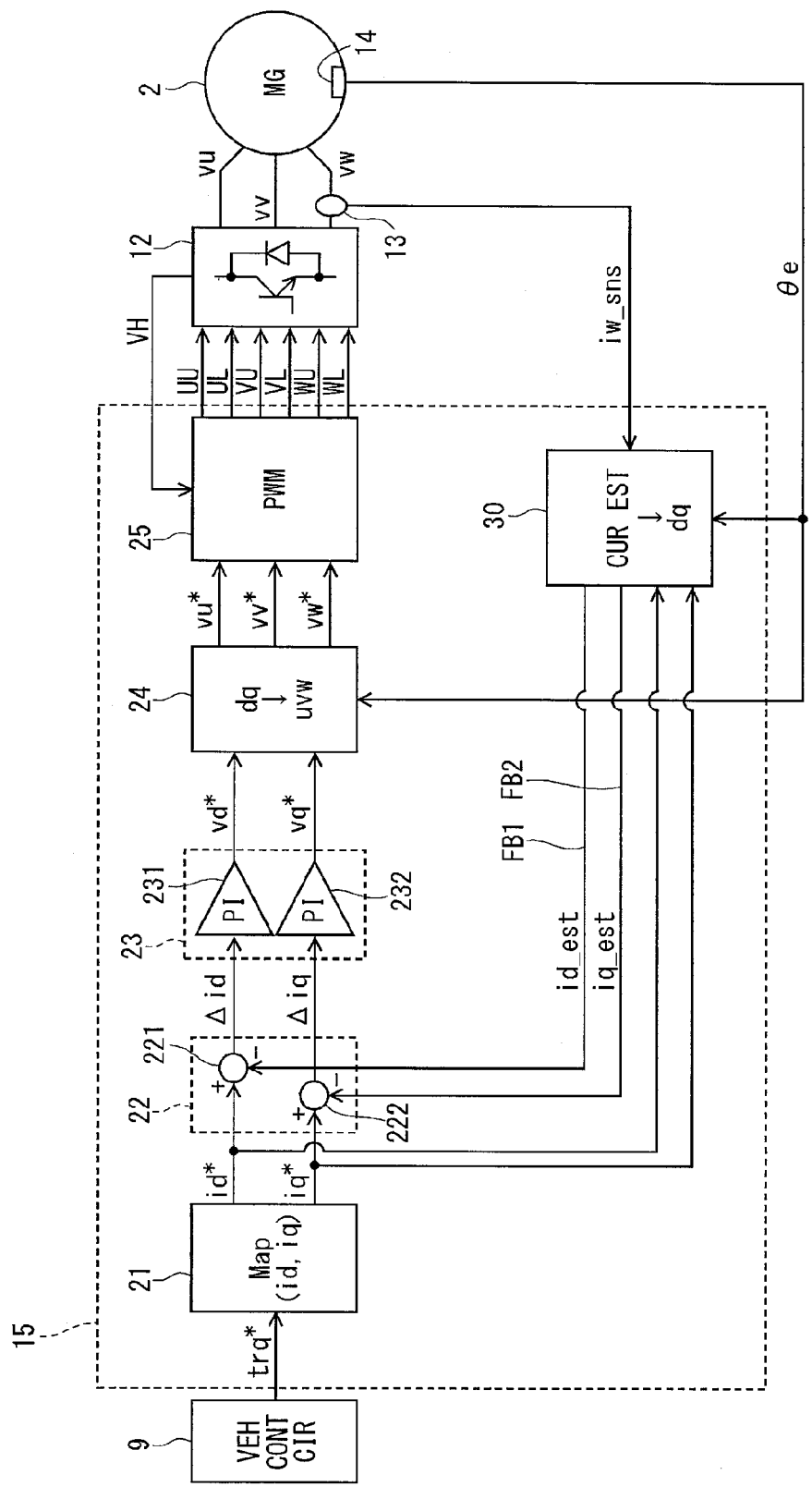
FIG. 3 is a block diagram to show the construction of the electric motor control device of the first embodiment of the present invention.

As shown in FIG. 3, the control section 15 includes a current command value calculation part 21, a subtracter 22, a PI operation part 23, an inverse dq transformation part 24, a PWM signal generation part 25, and a current estimation part 30.

The current command value calculation part 21 operates a d-axis current command value id* and a q-axis current command value iq* in a rotating coordinate system ((d, q) coordinate system) set as the rotating coordinates of the AC motor 2 on the basis of the torque command value trq* acquired from the vehicle control circuit 9. In the present embodiment, the d-axis current command value id* and the q-axis current command value iq* are operated with reference to a previously stored map but may be operated by a mathematical formula or the like. The d-axis current command value id* and the q-axis current command value iq* are updated in a long cycle (command update cycle Cd to be described later) that is equal to the update cycle of the torque command value trq*. In other words, the command update cycle Cd is longer than the sensor phase current sensing cycle Cs.

The subtracter 22 has a d-axis current subtracter 221 and a q-axis current subtracter 222. The d-axis current subtracter 221 calculates a d-axis current deviation Δid, which is a difference between a d-axis current estimated value id_est calculated and fed back by the current estimation part 30, and the d-axis current command value id*. Further, the q-axis current subtracter 222 calculates a q-axis current deviation Δiq, which is a difference between a q-axis current estimated value iq_est calculated and fed back by the current estimation part 30, and the q-axis current command value iq*.

The PI operation part 23 has a d-axis operation part 231 and a q-axis operation part 232. The d-axis operation part 231 calculates a d-axis voltage command value vd* by a PI operation in such a way that the d-axis current deviation Δid converges to 0 so as to make the d-axis current estimated value id_est follow the d-axis current command value id*. Further, the q-axis operation part 232 calculates a q-axis voltage command value vq* by the PI operation in such a way that the q-axis current deviation Δiq converges to 0 so as to make the q-axis current estimated value iq_est follow the q-axis current command value iq*

The inverse dq transformation part 24 transforms the d-axis voltage command value vd* and the q-axis voltage command value vq* to a U phase voltage command value vu*, a V phase voltage command value vv*, and a W phase voltage command value vw* on the basis of the electric angle θe acquired from the rotation angle sensor 14.

The PWM signal generation part 25 calculates PWM signals UU, UL, VU, VL, WU, WL, which relate to switching on or off the switching elements of the inverter 12, on the basis of three-phase AC voltage command values vu*, w*, vw* and the system voltage VH of a voltage to be impressed on the inverter 12.

Then, the switching elements of the inverter 12 are switched on or off on the basis of the PWM signals UU, UL, VU, VL, WU, WL, whereby the three-phase voltage command values vu, w, vw are generated. Then, the three-phase voltage command values vu, w, vw are impressed on the AC motor 2. Then, the drive of the AC motor 2 is controlled in such a way as to output a torque responsive to the torque command value trq*. In this regard, the three-phase AC voltages vu, w, vw correspond to "impressed voltages".

Here, a PWM control will be described.

A sine wave PWM control of an ordinary PWM control compares a voltage command in a sine waveform with the voltage of a carrier wave (typically, triangle wave) to thereby switch on or off the switching elements of the inverter 12. Specifically, in a set of a high level period, which corresponds to an on period of a higher arm element of the switching element constructing a higher arm connected in a bridge mode, and a low level period, which corresponds to an on period of a lower arm element of the switching element constructing a lower arm connected in the bridge mode, duty is controlled in a specified period in such a way that a fundamental wave component of a line voltage (hereinafter, as required, simply referred to as "line voltage of the AC motor 2") of the three-phase voltages vu, w, vw impressed on the AC motor 2 becomes a sine wave. In the sine wave PWM control, the amplitude of the voltage command in the sine waveform is not more than the amplitude of the carrier wave, so that the line voltage of the AC motor 2 has a sine waveform.

In the sine wave PWM control, the amplitude of the voltage command in the sine waveform is limited to a magnitude not more than the amplitude of the carrier wave, so that the line voltage of the AC motor 2 can be increased to only a level of approximately 0.61 times the system voltage VH to be impressed on the inverter 12. Here, when it is assumed that the ratio of the fundamental wave component (effective value) of the line voltage of the AC motor 2 to the system voltage VH to be impressed on the inverter 12 is a "modulation factor", in the sine wave PWM control, the modulation factor is approximately 0.61 at a maximum value.

In the sine wave PWM control, a voltage command may be generated by superimposing a 3n-th harmonic wave component on the voltage command in the sine waveform. As to the 3n-th harmonic wave component, n can be a natural number and here, assuming that n=1, that is, the 3n-th harmonic wave component is a third harmonic wave component, the sine wave PWM control will be described. When the third harmonic wave component is superimposed on the voltage command in the sine waveform, the voltage command having the third harmonic wave component superimposed thereon does not have a sine waveform but has a waveform having a period in which the amplitude of the voltage command becomes larger than the amplitude of the carrier wave. However, the third harmonic wave components superimposed on the respective phases are cancelled between the lines and hence the line voltage of the AC motor 2 can be held in the sine waveform. In this way, the modulation factor can be increased to approximately 0.71.

Furthermore, in the present embodiment, in the case where the voltage to be impressed on the AC motor 2 needs to be further increased, an overmodulation PWM control is also performed so as to further increase the modulation factor.

In the overmodulation PWM control, the same PWM control as the sine wave PWM control described above is performed within a range in which the amplitude of the voltage command is larger than the amplitude of the carrier wave. In the overmodulation PWM control, the amplitude of the voltage command is corrected to thereby distort the voltage command from the sine wave, whereby the modulation factor can be increased to approximately 0.78 at a maximum. In the overmodulation PWM control, the amplitude of the voltage command is larger than the amplitude of the carrier wave and hence the line voltage of the AC motor 2 does not have a sine waveform but has a distorted waveform.

The current estimation part 30 calculates the d-axis current estimated value id_est and the q-axis current estimated value iq_est on the basis of the sensor phase current sensed value iw_sns, the electric angle θe, the d-axis current command value id*, and the q-axis current command value iq*. In this regard, the d-axis current estimated value id_est and the q-axis current estimated value iq_est are calculated on the basis of the d-axis current command value id* and the q-axis current command value iq*, which are long in the update cycle, and the sensor phase current sensed value iw_sns and the electric angle θe, which are short in the update cycle, that is, on the basis of information which are different from each other in quality such as the update cycle.

Here, the estimation of the current of an estimation phase, which is a phase other than the sensor phase in the current estimation part 30, will be described.

For example, in the case where the current sensors 13 are disposed in two phases, by the use of the Kirchhoff's law such that the sum of instantaneous values of three-phase currents iu, iv, iw becomes 0, the current of a remaining one phase in which the current sensor 13 is not disposed can be easily calculated.

On the other hand, in the present embodiment, the current sensor 13 is disposed in only the W phase, so that the current of a phase in which the current sensor 13 is not disposed is estimated on the basis of the d-axis current command value id* and the q-axis current command value iq* as well as the current sensed value iw_sns of one sensor phase and the electric angle θe. In the present embodiment, an example will be described in which an estimation phase current estimated value iu_est is calculated with the U phase assumed to be an estimation phase. In this regard, the estimation phase can be either phase other than the sensor phase.

Figure 4:
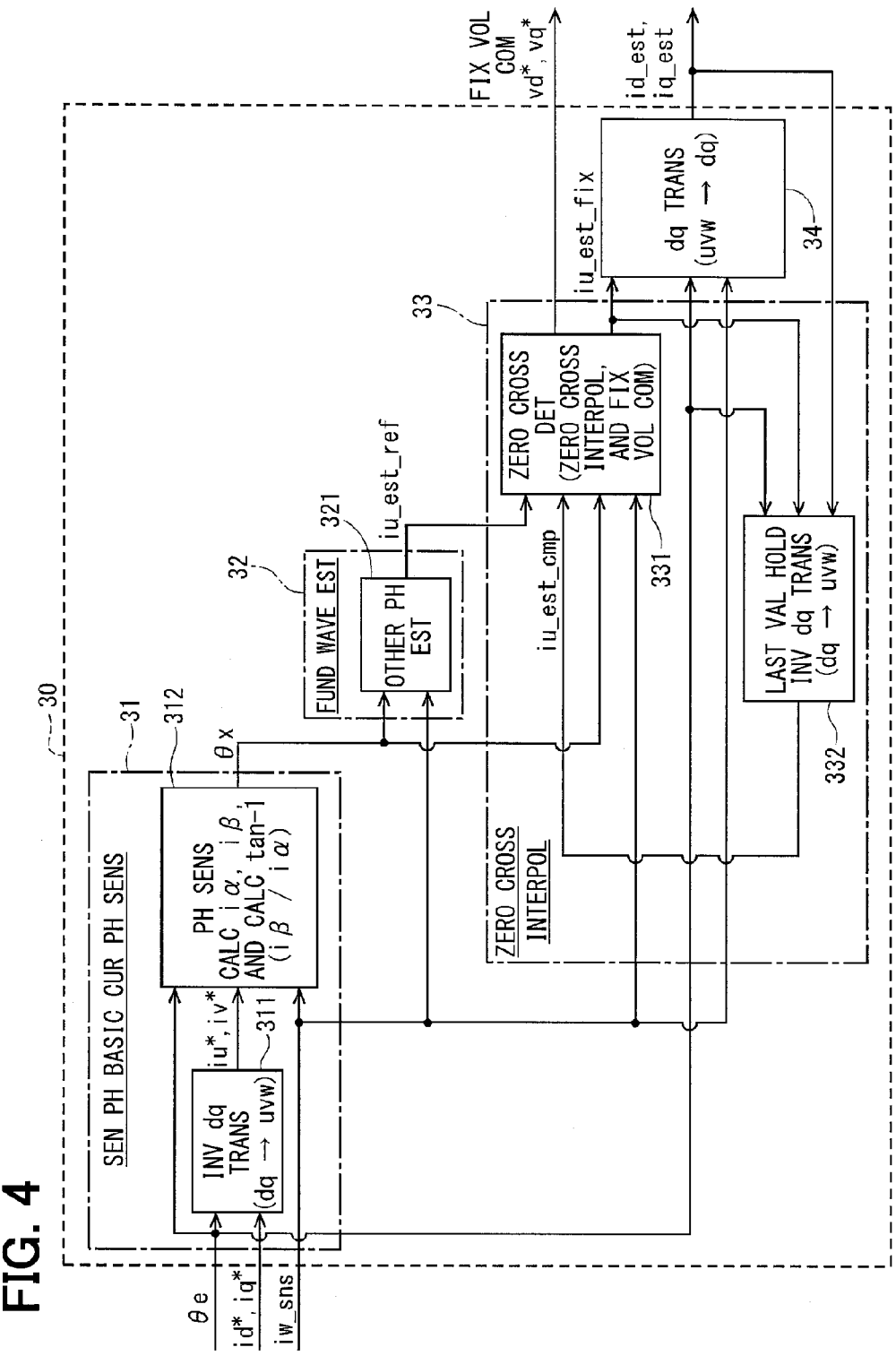
FIG. 4 is a block diagram to show a construction of a current estimation part of the first embodiment of the present invention.

As shown in FIG. 4, the current estimation part 30 has a sensor phase basic current phase sensing part 31, a fundamental wave estimation part 32, a zero crossing interpolation part 33, and a dq transformation part 34.

The sensor phase basic current phase sensing part 31 has an inverse dq transformation part 311 and a phase sensing part 312.

First, the inverse dq transformation part 311 acquires the d-axis current command value id* and the q-axis current command value iq*, which are calculated by the current command value operation part 21, and the electric angle θe and then calculates the U phase current command value iu* and the V phase current command value iv* by the inverse dq transformation. In this regard, the current command value to be calculated can be calculated for only either phase other than the estimation phase, so that in the present embodiment, it is assumed that the V phase current command value iv* is calculated.

The phase sensing part 312 calculates a sensor phase basic current phase θx on the basis of the V phase current command value iv*, which is calculated by the inverse dq transformation part 311, and the sensor phase current sensed value iw_sns.

Figure 5:
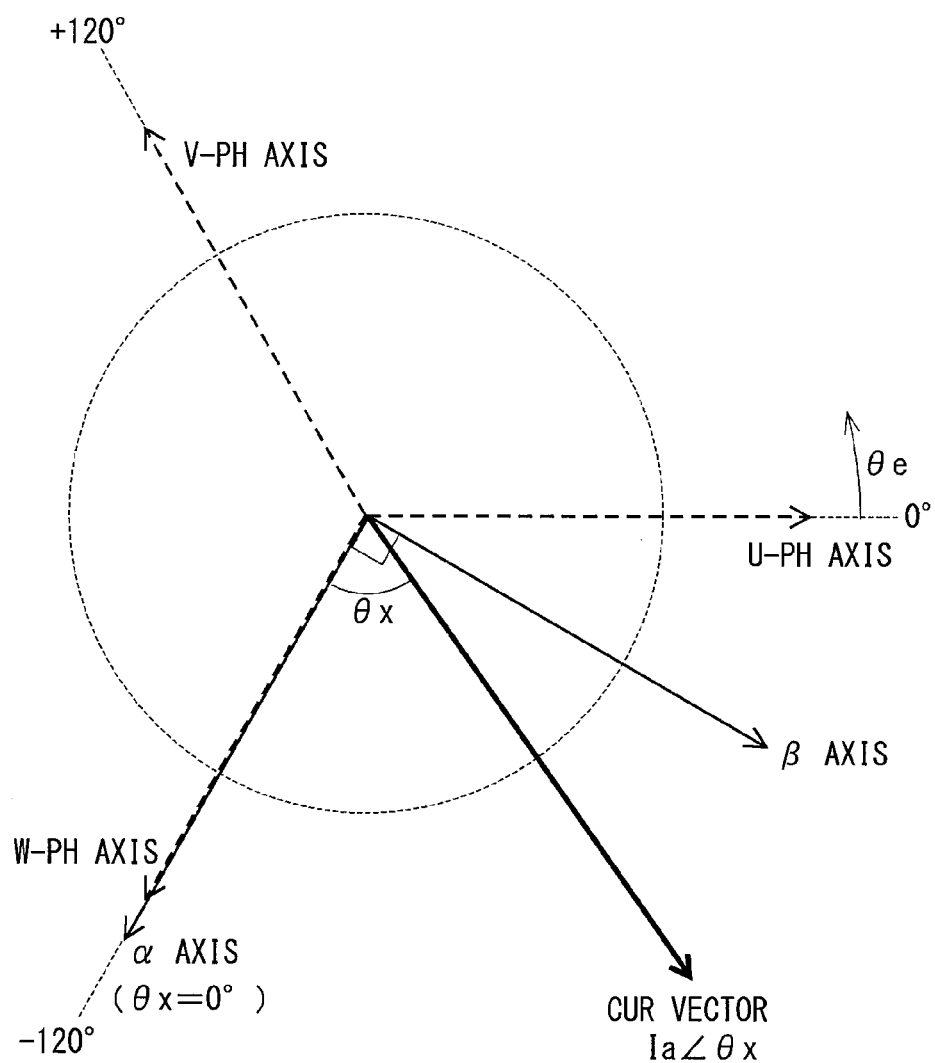
FIG. 5 is an illustration to illustrate an α axis and a β axis of the first embodiment of the present invention.

As shown in FIG. 5, when it is assumed that the W phase of the sensor phase is an α axis, the sensor phase basic current phase θx is an angle formed by the α axis and a current vector Ia∠θx. In other words, describing the sensor phase basic current phase θx, in a powering state of a normal rotation and a plus torque, the sensor phase basic current phase θx when the waveform of the W phase current iw crosses zero from a minus side to a plus side becomes 0°, whereas the sensor phase basic current phase θx when the waveform of the W phase current iw crosses zero from the plus side to the minus side becomes 180°. That is, the sensor phase basic current phase θx is an angle synchronous with the sensor phase current sensed value iw_sns.

In the present embodiment, the phase sensing part 312 calculates the sensor phase basic current phase θx on the basis of a α-axis current iα and a β-axis current iβ.

Here, the α-axis current iα and the β-axis current iβ used for calculating the sensor phase basic current phase θx will be described. When the α-axis current iα and the β-axis current iβ are expressed by the use of the respective phase currents iu, iv, iw, the α-axis current iα and the β-axis current iβ are expressed by an equation (1) and an equation (2), respectively. Here, K in the equations (1) and (2) is a transformation coefficient.

[Mathematical formula 1]

$$i\alpha = K \times \left(iw - \frac{1}{2} \times iu - \frac{1}{2} \times iv\right) \quad (1)$$

$$i\beta = K \times \left(\frac{\sqrt{3}}{2} \times iu - \frac{\sqrt{3}}{2} \times iv\right) \quad (2)$$

Further, from the Kirchhoff's law, the sum of the instantaneous values of three phase currents iu, iv, iw becomes 0, that is, the following equation (3) holds.

$$iu + iv + iw = 0 \quad (3)$$

Here, when the equation (3) is changed by the use of the equation (1), the following equation (4) can be acquired.

[Mathematical formula 2]

$$i\alpha = K \times \frac{3}{2} \times iw \quad (4)$$

That is, as shown in equation (4), the α-axis current iα can be calculated on the basis of only the W phase current iw of the sensor phase. Here, when the sensor phase current sensed value iw_sns is used as the W phase current iw, an α-axis current sensed value iα_sns is expressed by the following equation (5).

[Mathematical formula 3]

$$i\alpha\_sns = K \times \frac{3}{2} \times iw\_sns \quad (5)$$

Furthermore, when the equation (2) is referred to and the current command value iu* is used as the U phase current iu and the current command value iv* is used as the V phase current iv, a β-axis current estimated value iβ_est is expressed by the following equation (6).

[Mathematical formula 4]

$$i\beta\_est = K \times \left(\frac{\sqrt{3}}{2} \times iu^* - \frac{\sqrt{3}}{2} iv^*\right) \quad (6)$$

In the equation (6), the β-axis current estimated value iβ_est is calculated from the current command values iu* and iv* and does not include the component of the sensor phase current sensed value iw_sns sensed by the current sensor 13. For this reason, the β-axis current estimated value iβ_est calculated from the equation (6) does not always become information reflecting an actual current with high accuracy.

Hence, when the equation (6) is changed on the basis of the Kirchhoff's law (equation (3)) in such a way that the β-axis current estimated value iβ_est contains the sensor phase current sensed value iw_sns, the following equation (7) is acquired.

[Mathematical formula 5]

$$i\beta\_est = K \times \left(-\sqrt{3} \times iv^* - \frac{\sqrt{3}}{2} iw\_sns\right) \quad (7)$$

As shown in equation (7), when the β-axis current estimated value iβ_est is made to contain the sensor phase current sensed value iw_sns, the β-axis current estimated value iβ_est can respond to a variation in control and hence can narrow a region in which a W phase axis component is small and is hard to converge, whereby the accuracy of the β-axis current estimated value iβ_est can be improved. In short, the accuracy of sensing the sensor phase basic current phase θx calculated on the basis of the β-axis current estimated value iβ_est can be improved.

The sensor phase basic current phase θx can be calculated from the following equation (8) on the basis of the α-axis current sensed value iα_sns (see the equation (5)) and the β-axis current estimated value iβ_est (see the equation (7)), which are calculated in the manner described above. In this regard, in the following equation (8), the equation (6) may be used in place of the equation (7) for the β-axis current estimated value iβ_est.

[Mathematical formula 6]

$$\theta x = \tan^{-1}\left(\frac{i\beta\_est}{i\alpha\_sns}\right) \quad (8)$$

Here, as shown by the equation (8), in the case where the sensor phase basic current phase θx is calculated by the use of an inverse tangent function ($\tan^{-1}$), depending on the definition of the α-axis current iα and the β-axis current iβ, there is caused a case in which the sensor phase basic current phase θx does not become an angle synchronous with the W phase of the sensor phase. This is caused by the definition of the axis (for example, an interchange or a sign inversion of the α-axis and the β-axis). Hence, in such a way that when the sensor phase current sensed value iw_sns in the case of the normal rotation and the plus torque crosses zero from the minus side to the plus side, the sensor phase basic current phase θx becomes 0°, and that when the sensor phase current sensed value iw_sns crosses zero from the plus side to the minus side, the sensor phase basic current phase θx becomes 180°, in other words, in such a way that the sensor phase basic current phase θx becomes an angle synchronous with the sensor phase current sensed value iw_sns, for example, the signs of the α-axis current iα and the β-axis current iβ are operated and then the sensor phase basic current phase θx may be calculated, or the α-axis current iα and the β-axis current iβ may be interchanged with each other, or a phase difference 90° caused by an orthogonal relationship may be appropriately added to or subtracted from the calculated sensor phase basic current phase θx.

In this way, the sensor phase basic current phase θx calculated in the phase sensing part 312 on the basis of the α-axis current sensed value iα_sns and the β-axis current sensed value iβ_sns is outputted to the fundamental wave estimation part 32.

The fundamental wave estimation part 32 has an other phase estimation part 321. The other phase estimation part 321 calculates an estimation phase current estimated value iu_est on the basis of the sensor phase basic current phase θx, which is calculated in the phase sensing part 312, and the sensor phase current sensed value iw_sns.

Here, when the sensor phase current sensed value iw_sns and the estimation phase current estimated value iu_est are expressed by the use of the sensor phase basic current phase θx, an equation (9) and an equation (10) can be acquired because the phase difference between the respective phases is 120[°]. Here, Ia in the equations (9), (10) is a current amplitude.

$$iw\_sns = Ia \times \sin(\theta x) \quad (9)$$

$$iu\_sns = Ia \times \sin(\theta x - 120°) \quad (10)$$

Furthermore, when the equation (10) is changed by the use of an addition theorem, the estimation phase current estimated value iu_est is expressed by the following equation (11) on the basis of the sensor phase basic current phase θx and the sensor phase current sensed value iw_sns.

[Mathematical formula 7]

$$\begin{aligned}
iu\_est &= Ia \times \sin(\theta x - 120°) \quad (11)\\
&= -\frac{1}{2} \times Ia \times \sin(\theta x) - \frac{\sqrt{3}}{2} \times Ia \times \cos(\theta x)\\
&= -\frac{1}{2} \times iw\_sns - \frac{\sqrt{3}}{2} \times \frac{Ia \times \sin(\theta x)}{\tan(\theta x)}\\
&= \left\{-\frac{1}{2} - \frac{\sqrt{3}}{2} \times \frac{1}{\tan(\theta x)}\right\} \times iw\_sns
\end{aligned}$$

Furthermore, when it is assumed that an estimation coefficient iu_kp is an equation (12), the estimation phase current estimated value iu_est can be also expressed by an equation (13). Here, the estimation coefficient iu_kp may be directly operated by the use of the equation (12) or may be calculated in the following manner: that is, a part or all of the equation (12) is previously expressed by a map on the basis of the sensor phase basic current phase θx and then the estimation coefficient iu_kp is calculated with reference to the map.

In this regard, in the case where the control section 15 is an ordinary electronic control circuit (microcomputer), when the control section 15 is mounted with an operation equation, an operation is performed not on a continuous time base but on a discrete time base and hence the sensor sensed values and the respective operated values are treated as discrete values based on a specified resolution (LSB). Here, it is assumed that the meaning of "being mounted with an operation equation" includes a program of software and a construction of a hardware circuit. Furthermore, in order to avoid multiplication or division requiring a large processing load, it is effective to make an argument the sensor phase basic current phase θx and to express the estimation coefficient iu_kp or a term of {1/tan(θx)} in the estimation coefficient iu_kp in a map. This map can facilitate application to a discrete system and can minimize the processing load of the microcomputer. In this way, it is not necessary to use an expensive microcomputer having a high operation processing capacity.

[Mathematical formula 8]

$$iu\_kp = -\frac{1}{2} - \frac{\sqrt{3}}{2} \times \frac{1}{\tan(\theta x)} \quad (12)$$

$$iu\_est = iu\_kp \times iw\_sns \quad (13)$$

In this regard, when referring to the equation (11) or the equation (13), the current amplitude Ia is not used in the case where the estimation phase current estimated value iu_est is calculated on the basis of the sensor phase basic current phase θx and the sensor phase current sensed value iw_sns. Hence, the current amplitude Ia does not need to be found and hence variables to be operated can be reduced.

In the other phase estimation part 321, the estimation phase basic current estimated value iu_est calculated on the basis of the sensor phase basic current phase θx and the sensor phase current sensed value iw_sns is outputted as an estimation phase current estimated value (reference value) iu_est_ref to the zero crossing interpolation part 33.

Here, when the sensor phase current sensed value iw_sns becomes 0[A] or when tangent tan(θx) of the sensor phase basic current phase θx reaches an infinite value, in the equation (11), "zero multiplication" of multiplying some value by 0 is caused. Furthermore, when tangent tan(θx) of the sensor phase basic current phase θx becomes 0, in the equation (11), "zero division" of dividing some value by 0 is caused. For this reason, the estimation phase current estimated value iu_est is likely to be varied.

Hence, in the present embodiment, in the zero crossing interpolation part 33, the estimation phase current estimated value (reference value) iu_est_ref is interpolated to thereby mask "zero multiplication" and "zero division".

The zero crossing interpolation part 33 has a zero crossing determination part 331 and a last value holding part 332.

The zero crossing determination part 331 determines whether or not a zero crossing condition is satisfied. In the present embodiment, when the sensor phase current sensed value iw_sns is within a specified range containing 0[A], the zero crossing determination part 331 determines that the zero crossing condition is satisfied. The phase of "within a specified range" means that an absolute value of the sensor phase current sensed value iw_sns is not more than a specified value or that an absolute value of the estimation coefficient iu_kp is not less than a specified value. Here, "the specified value" may be set by a current value of, for example, ±5[A], or may be set on the basis of resolution in the discrete system, for example, 5[LSB], or may be set by a mathematical formula or the like. Furthermore, on the basis of the sensor phase basic current phase θx, the zero crossing determination part 331 may determine whether or not a zero crossing condition is satisfied: that is, when the sensor phase basic current phase θx is within a specified zero crossing range, the zero crossing determination part 331 may determine that the zero crossing condition is satisfied.

In the case where it is determined that the zero crossing condition is not satisfied, the estimation phase current estimated value (reference value) iu_est_ref calculated by the other phase estimation part 321 is outputted as the estimation phase current estimated value (fixed value) iu_est_fix to the dq transformation part 34 as it is.

On the other hand, in the case where it is determined that the zero crossing condition is satisfied, the d-axis current deviation Δid and the q-axis current deviation Δiq are forcibly made 0[A] to thereby fix the d-axis current command value vd* and the q-axis current command value vq*. Alternatively, the d-axis current command value vd* and the q-axis current command value vq* may be held at the values of the last time, thereby being directly fixed.

Furthermore, an estimation phase current estimated value (interpolated value) iu_est_cmp is acquired from the last value holding part 332. Then, the estimation phase current estimated value (interpolated value) iu_est_cmp is outputted as the estimation phase current estimated value (fixed value) iu_est_fix to the dq transformation part 34.

The last value holding part 332 holds the value of the last time in advance and, in the case where it is determined that the zero crossing condition is satisfied, the last value holding part 332 calculates the estimation phase current estimated value (interpolated value) iu_est_cmp and outputs the estimation phase current estimated value (interpolated value) iu_est_cmp to the zero crossing determination part 331.

For example, the last value holding part 332 holds the estimation phase current estimated values (fixed value) iu_est_fix, calculated in the past, of a specified number of times in the nearest past as estimation phase current estimated values (held value) iu_est_hld. Then, in the case where it is determined that the zero crossing condition is satisfied, the estimation phase current estimated value (held value) iu_est_hld, which is a value of the last time or a value of the time before the last time, is outputted as the estimation phase current estimated value (interpolated value) iu_est_cmp to the zero crossing determination part 331.

Furthermore, for example, the last value holding part 332 holds the d-axis current estimated values id_est and the q-axis current estimated values iq_est, calculated in the past by the dq transformation part 34, of a specified number of times in the nearest past as d-axis current estimated values (held value) id_est_hld and q-axis current estimated values (held value) iq_est_hld. In the case where it is determined that the zero crossing condition is satisfied, the d-axis current estimated value (held value) id_est_hld and the q-axis current estimated value (held value) iq_est_hld, each of which is a value of the last time or a value of the time before the last time, are inversely dq transformed and are outputted as the estimation phase current estimated value (interpolated value) iu_est_cmp to the zero crossing determination part 331.

The dq transformation part 34 calculates the d-axis current estimated values id_est and the q-axis current estimated values iq_est by the dq transformation on the basis of the estimation phase current estimated values (fixed value) iu_est_fix acquired from the zero crossing interpolation part 33, the sensor phase current sensed value iw_sns, and the electric angle θe.

The calculation of the d-axis current estimated values id_est and the q-axis current estimated values iq_est in the dq transformation part 34 will be described.

First, a general equation of the dq transformation will be shown by the following equation (14).

[Mathematical formula 9]

$$\begin{bmatrix} id\_est \\ iq\_est \end{bmatrix} = \sqrt{\frac{2}{3}} \begin{bmatrix} \cos(\theta e) & \cos(\theta e - 120°) & \cos(\theta e + 120°) \\ -\sin(\theta e) & -\sin(\theta e - 120°) & -\sin(\theta e + 120°) \end{bmatrix} \begin{bmatrix} iu \\ iv \\ iw \end{bmatrix} \quad (14)$$

Here, iv=−iu−iw from the Kirchhoff's law (see equation (3)), iu=iu_est, and iw=iw_sns are substituted into the equation (14), whereby the following equation (15) is acquired. Here, in the present embodiment, the estimation phase current estimated values (fixed value) iu_est_fix subjected to a zero crossing correction is used as the estimation phase current estimated value iu_est.

[Mathematical formula 10]

$$\begin{bmatrix} id\_est \\ iq\_est \end{bmatrix} = \sqrt{\frac{2}{3}} \begin{bmatrix} \cos(\theta e) - & \cos(\theta e + 120°) - \\ \cos(\theta e - 120°) & \cos(\theta e - 120°) \\ -\sin(\theta e) + & -\sin(\theta e + 120°) + \\ \sin(\theta e - 120°) & \sin(\theta e - 120°) \end{bmatrix} \begin{bmatrix} iu\_est \\ iw\_sns \end{bmatrix} \quad (15)$$

$$= \sqrt{\frac{2}{3}} \times \sqrt{3} \begin{bmatrix} \cos(\theta e + 30°) & -\cos(\theta e - 90°) \\ -\sin(\theta e + 30°) & \sin(\theta e - 90°) \end{bmatrix} \begin{bmatrix} iu\_est \\ iw\_sns \end{bmatrix}$$

$$= \sqrt{2} \begin{bmatrix} \sin(\theta e + 120°) & -\sin(\theta e) \\ \cos(\theta e + 120°) & -\cos(\theta e) \end{bmatrix} \begin{bmatrix} iu\_est \\ iw\_sns \end{bmatrix}$$

As shown by the equation (15), if current values (sensed values or estimated values) of two phases among three phases are found, the d-axis current estimated value id_est and the q-axis current estimated value iq_est can be calculated. Hence, it is only necessary that the other phase estimation part 321 calculates only the current estimated value of one phase (U phase in the present embodiment) and it is not necessary that the other phase estimation part 321 calculates the current estimated value of the other phase (V phase in the present embodiment).

Here, in the present embodiment, the estimation phase current estimated value iu_est used for calculating the d-axis current estimated value id_est and the q-axis current estimated value iq_est is calculated on the basis of the sensor phase basic current phase θx. Further, the sensor phase basic current phase θx is calculated on the basis of the α-axis current sensed value iα_sns and the β-axis current sensed value iβ_est. Furthermore, in the case where the β-axis current sensed value iα_est is calculated on the basis of the equation (7), the β-axis current sensed value iβ_est is calculated on the basis of the V phase current command value iv*, which is calculated by inversely dq transforming the d-axis current command value id* and the q-axis current command value iq*, and the sensor phase current sensed value iw_sns. Then, the d-axis current command value id* and the q-axis current command value iq* are calculated on the basis of the torque command value trq*.

Here, in the present embodiment, the torque command value trq* is suddenly changed in some cases by a user request or a vehicle request. For example, when the user depresses an accelerator pedal or a brake pedal, the torque command value trq* is suddenly changed by a user request. Further, for example, in the case where the traction control of preventing a tire from idling according to the state of a road surface is performed, the torque command value trq* is suddenly changed in some cases also by a vehicle request.

When the torque command value trq* is suddenly changed, the d-axis current command value id* and the q-axis current command value iq*, which are command values based on the torque command value trq*, and the V phase current command value iv* are suddenly changed. Further, when the d-axis current command value id* and the q-axis current command value iq* are suddenly changed, the sensor phase current sensed value iw_sns and the α-axis current sensed value iα_sns, which are sensed values, are also suddenly changed. For this reason, the β-axis current estimated value iβ_est, which is calculated on the basis of the V phase current command value iv* and the sensor phase current sensed value iw_sns, is also suddenly changed, and hence the sensor phase basic current phase θx, which is calculated on the basis of the β-axis current estimated value iβ_est and the α-axis current sensed value iα_sns, is also suddenly changed. Then, the estimation phase current estimated value iu_est, which is calculated on the basis of the sensor phase basic current phase θx and the sensor phase current sensed value iw_sns, is also suddenly changed, so that the d-axis current estimated value id_est and the q-axis current estimated value iq_est are also suddenly changed.

In other words, when the V phase current command value iv* is suddenly changed, a difference between the V phase current command value iv* and the V phase actual current value iv becomes large because of a delay in response to control. Further, when the β-axis current estimated value iβ_est is suddenly changed, a difference between the β-axis current estimated value iβ_est and a β-axis actual current value iβ becomes large because of the difference between the V phase current command value iv* and the V phase actual current value iv, which is caused by the delay in response to control.

In addition, specifically, as shown in FIG. 17A, when the torque command value trq* is increased, a control mode is changed in some case from the sine wave PWM control to the overmodulation PWM control with an increase in the torque command value trq*, as shown in FIG. 17B. The overmodulation PWM control is lower in response than the sine wave PWM control. For this reason, in the case where a sudden change of the same level is caused in the overmodulation PWM control and the sine wave PWM control, response to the torque command trq* is further delayed in the overmodulation PWM control than in the sine wave PWM control. Hence, as shown in FIG. 17C, when the torque command value trq* is increased, a difference between the V phase current command value iv* shown by a broken line and the V phase actual current value iv shown by a solid line becomes large because of a delay in response even in the sine wave PWM control and becomes more significant in the overmodulation PWM control. Similarly, as shown in FIG. 17D, when the torque command value trq* is increased, a difference between the β-axis current estimated value iβ_est shown by a single dot and dash line and the β-axis actual current value iβ shown by a solid line becomes large because of a delay in response.

This difference between the command value or the estimated value and the actual value, which is caused by a delay in response, is also caused in the same way when the torque command value trq* is decreased.

Here, referring to the equation (7), the equation for calculating the β-axis current estimated value iβ_est includes a term relating to the V phase current command value iv* and a term relating to the sensor phase current sensed value iw_sns.

The term relating to the V phase current command value iv* becomes 0 [A] every 180[°]. When the V phase current command value iv* becomes 0[A], since the calculated β-axis current estimated value iβ_est does not include an element of a command value component, the β-axis current estimated value iβ_est is determined by the sensor phase current sensed value iw_sns.

Further, the term relating to the sensor phase current sensed value iw_sns also becomes 0[A] every 180[°] in a phase shifted by 120[°] from the V phase. When the sensor phase current sensed value iw_sns becomes 0[A], since the calculated β-axis current estimated value iβ_est does not include an element of a sensed value component, the β-axis current estimated value iβ_est is determined by the command value component. Hence, as the difference between the V phase current command value iv* and the V phase actual current value iv becomes larger, the β-axis current estimated value iβ_est is further affected by the difference.

From the above descriptions, as shown in FIG. 17C, a point in which the V phase current command value iv* corresponds with the V phase actual current value iv and a point in which the difference between the V phase current command value iv* and the V phase actual current value iv becomes large are repeated cyclically in a cycle corresponding to half of one cycle of the current. Similarly, as shown in FIG. 17D, a point in which the β-axis current estimated value iβ_est corresponds with the β-axis actual current value iβ and a point in which the difference between the β-axis current estimated value iβ_est and the β-axis actual current value iβ becomes large are repeated cyclically in a cycle corresponding to half of one cycle of the current at the same timing when the V phase current command value iv* and the V phase actual current value iv are cyclically changed.

The difference between the V phase current command value iv* and the V phase actual current value iv and the difference between the β-axis current estimated value iβ_est and the β-axis actual current value iβ are not caused in a steady state in which the torque command trq* is not suddenly changed. However, the difference is particularly significantly caused immediately after the torque command trq* rises up or down and in the overmodulation PWM control which is low in response.

In this way, when torque command value trq* is suddenly changed, the sensor phase basic current phase θx, which is calculated on the basis of the β-axis current estimated value iβ_est and the α-axis current sensed value iα_sns, is also suddenly changed. Further, the estimation phase current estimated value iu_est, the d-axis current estimated value id_est, and the q-axis current estimated value iq_est, which are calculated on the basis of the sensor phase basic current phase θx and the sensor phase current sensed value iw_sns, are also suddenly changed.

As shown by reference characters FB1 and FB2 in FIG. 3, the d-axis current estimated value id_est and the q-axis current estimated value iq_est, which are calculated by the current estimation part 30, are fed back and are used for calculating the d-axis voltage command value vd* and the q-axis voltage command value vq*. Furthermore, as described above, when the torque command trq* is suddenly changed, the d-axis current estimated value id_est and the q-axis current estimated value iq_est are also suddenly changed. When the d-axis current estimated value id_est and the q-axis current estimated value iq_est, which are suddenly changed, are fed back, the d-axis voltage command value vd* and the q-axis voltage command value vq* are also suddenly changed. When a voltage pulse based on the d-axis voltage command value vd* and the q-axis voltage command value vq*, which are suddenly changed in this way, is impressed on the AC motor 2, torque outputted from the AC motor 2 is also suddenly changed.

In this regard, in the present embodiment, the d-axis current estimated value id_est and the q-axis current estimated value iq_est are calculated on the basis of the d-axis current command value id* and the q-axis current command value iq*, which are changed earlier than the d-axis actual current value id and the q-axis actual current value iq. Then, the d-axis current estimated value id_est and the q-axis current estimated value iq_est are fed back, whereby the drive of the AC motor 2 is controlled. In the present embodiment, the d-axis current command value id* and the q-axis current command value iq* are used for calculating the d-axis current estimated value id_est and the q-axis current estimated value iq_est, so that the d-axis current estimated value id_est and the q-axis current estimated value iq_est becomes values closer to the d-axis current command value id* and the q-axis current command value iq* than the d-axis actual current value id and the q-axis actual current value iq. Since the d-axis current estimated value id_est and the q-axis current estimated value iq_est are fed back to the d-axis current command value id* and the q-axis current command value iq*, the difference between the d-axis current estimated value id_est and the d-axis current command value id* and the difference between the q-axis current estimated value iq_est and the q-axis current command value iq* become smaller than in the case where the d-axis actual current value id and the q-axis actual current value iq are fed back, so that the voltage to be impressed on the AC motor 2 tends to be reduced. For this reason, the d-axis actual current value id and the q-axis actual current value iq which are actually passed through the AC motor 2 tends to be reduced when compared with the case where the current sensors 13 are disposed in two phases or three phases.

Hence, in the present embodiment, in order to prevent the d-axis voltage command value vd* and the q-axis voltage command value vq* from being suddenly changed respectively by a sudden change in the d-axis current command value id* and by a sudden change in the q-axis current command value iq*, a sudden change prevention processing is performed. Here, each of "the sudden change" in the d-axis current command value id* and "the sudden change" in the q-axis current command value iq* in the present embodiment is a change of the level in which in the case where the sudden change prevention processing is not performed on the assumption that the current sensor 13 is disposed in one phase, the output torque of the AC motor 2 does not converge to a desired value within a specified period. For example, even if an accelerator pedal is depressed by a given level in terms of the user's feeling, an accelerator opening recognized by the vehicle control circuit 9 is varied always within a small range, but it is assumed that a change in the d-axis current command value id* and a change in the q-axis current command value iq*, each of which is caused by the variation within the small range, are not included in "the sudden change" defined in the present embodiment. Further, in the feedback control, even if the d-axis current command value id* and the q-axis current command value iq* are not changed even within a small range but are constant, the d-axis actual current value id and the q-axis actual current value iq are varied within a small range and follow the d-axis current command value id* and the q-axis current command value iq*, and it is assumed that this variation within a small range is not included in "the sudden change" defined in the present embodiment. Then, for example, a range corresponding to "the sudden change" defined in the present embodiment is different according to the vehicle control circuit 9 and the operation speed of the control section 15. In other words, the range of "the sudden change" can be set appropriately according to the response of the AC motor 2 and the system of an operation speed and the like of the control section 15.

Here, the torque command value trq* calculated by the vehicle control circuit 9 is based mainly on a user's request and is operated in a slower cycle than in various operations in the control section 15. That is, in the present embodiment, the torque command value trq* and the d-axis current command value id* and the q-axis current command value iq*, which are calculated from the torque command value trq*, are updated in a command update cycle Cd, whereas various operations (update of the sensor phase current sensed value iw_sns, and operations of the d-axis voltage command value vd* and the q-axis voltage command value vq*) in the control section 15 are calculated in the sensor phase current sensing cycle Cs which is shorter than the command update cycle Cd.

Figure 18:
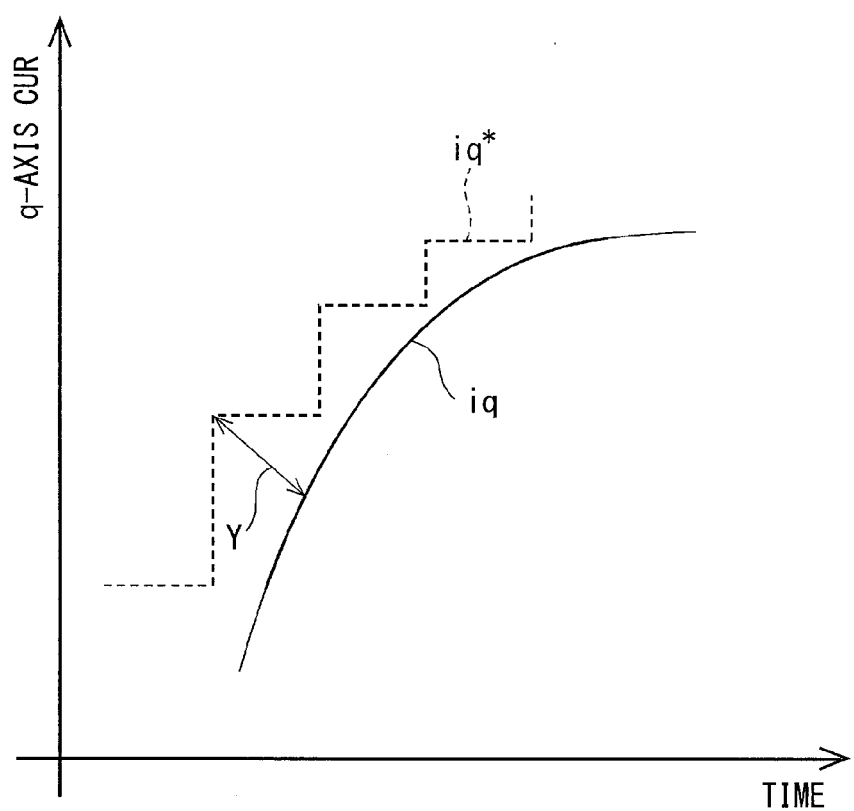
FIG. 18 is a chart to illustrate a difference between a q-axis current command value and a q-axis actual current value in the case where a torque command value is suddenly changed.

For this reason, as shown in FIG. 18, when the torque command value trq* is suddenly changed, the q-axis current command value iq* calculated from the torque command value trq* is changed stepwise and hence the difference between the q-axis current command value iq* and the q-axis actual current value iq is increased by the effect of a delay in the response to control, as shown by an arrow Y.

Further, as the difference between the q-axis current command value iq* and the q-axis actual current value iq (sensed value) is more increased, a variation range of the d-axis voltage command value vd* and a variation range of the q-axis voltage command value vq* are more increased. Conversely, when the difference between the q-axis current command value iq* and the q-axis actual current value iq (sensor value) is more decreased, a sudden change in the d-axis voltage command value vd* and a sudden change in the q-axis voltage command value vq* can be more decreased.

Here, FIG. 18 shows the q-axis current command value iq* and the q-axis actual current value iq at the time of the plus torque, but this is ditto for the case of other quadrant and for the d-axis current.

Figure 6:
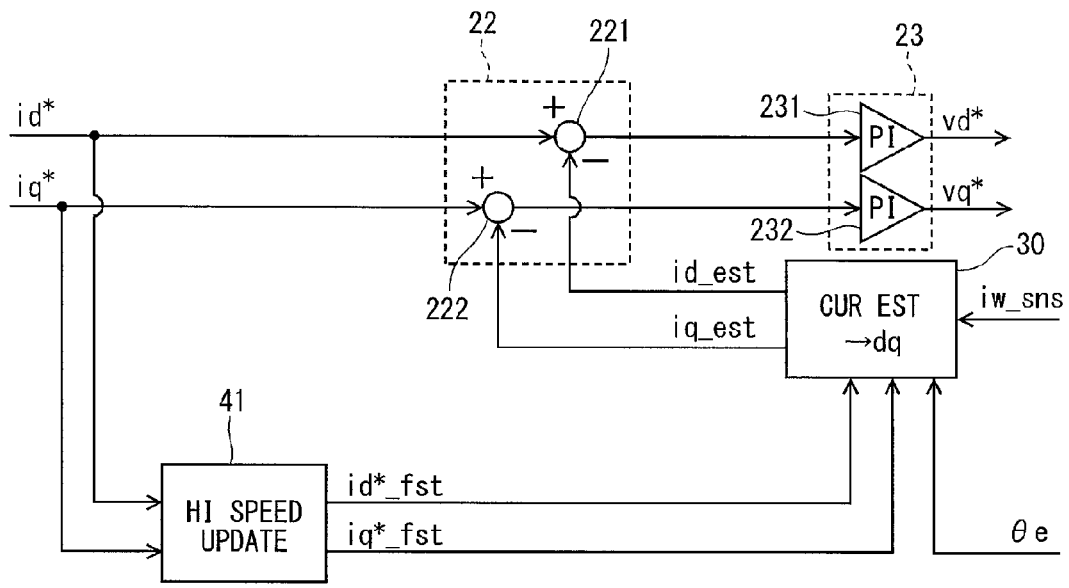
FIG. 6 is a block diagram to illustrate a sudden change prevention device according to the first embodiment of the present invention.

Hence, in the present embodiment, as shown in FIG. 6, the control section 15 has a high-speed update part 41 as the sudden change prevention processing so as to update the d-axis current command value id* and the q-axis current command value iq* at a high speed.

The high-speed update part 41 updates the d-axis current command value id* calculated by the current command value operation part 21 at a high speed in a high-speed update cycle Ch shorter than the command update cycle Cd to thereby calculate a d-axis high-speed update command value id*_fst. Similarly, the high-speed update part 41 updates the q-axis current command value iq* calculated by the current command value operation part 21 at a high speed in the high-speed update cycle Ch shorter than the command update cycle Cd to thereby calculate a q-axis high-speed update command value iq*_fst. In the present embodiment, by finely interpolating between a value of the last time and a value of this time of the d-axis command value id*, the d-axis high-speed update command value id*_fst is calculated. Describing in more detail, for example, since the command update cycle Cd and the high-speed update cycle Ch are determined in advance, the difference between the value of the last time and the value of this time of the d-axis current command value id* is uniformly divided by a division number equal to the high-speed update cycle Ch, or the difference between the value of the last time and the value of this time of the d-axis current command value id* is linearly interpolated, whereby the d-axis high-speed update command value id*_fst is calculated. Here, any interpolation method can be employed.

Similarly, by finely interpolating between a value of the last time and a value of this time of the q-axis current command value iq*, a q-axis high-speed update command value iq*_fst is calculated.

In this regard, it is assumed that the high-speed update cycle Ch of a high-speed update cycle in the high-speed update part 41 in the present embodiment is equal to the sensor phase current sensing cycle Cs of an operation cycle of various operations in the control section 15.

Figure 7:
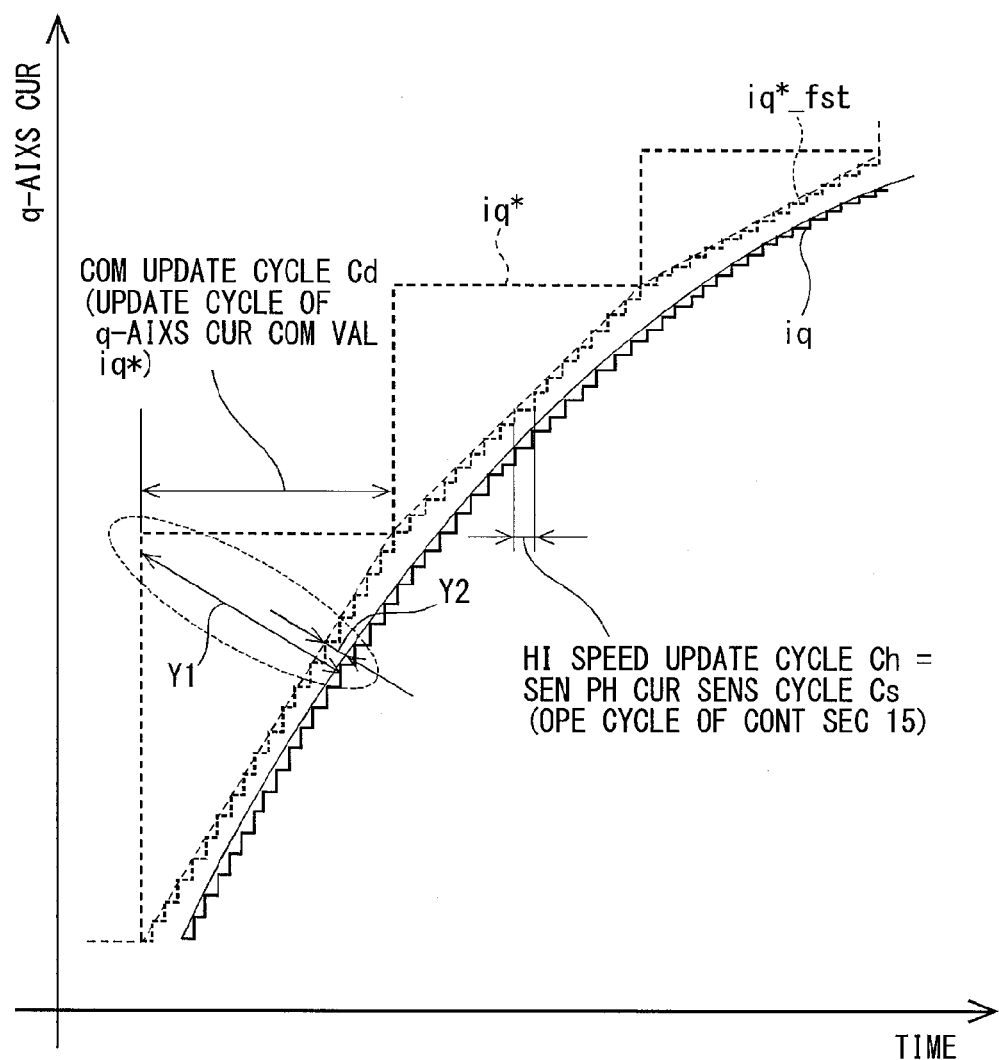
FIG. 7 is a chart to illustrate a high-speed update of a current command value in the first embodiment of the present invention.

FIG. 7 shows the q-axis current command value iq*, the q-axis high-speed update command value iq*_fst, and the q-axis actual current value iq at the time of the plus torque. As shown in FIG. 7, the q-axis current command value iq* is updated in the command update cycle Cd of the update cycle of the torque command value trq*. Further, the update cycle of the q-axis actual current value iq is determined by the operation cycle in the control section 15 and by the update cycle of the sensed value. In the present embodiment, the update cycle of the q-axis actual current value iq is equal to the operation cycle of the control section 15 and the sensor phase current sensing cycle Cs of the cycle of acquiring the sensor phase current sensed value iw_sns. For this reason, as shown by an arrow Y1, the q-axis current command value iq* greatly differs from the q-axis actual current value iq.

On the other hand, the q-axis high-speed update command value iq*_fst is updated at a high speed in the high-speed update cycle Ch, which is a cycle shorter than the command update cycle Cd and is equal to the sensor phase current sensing cycle Cs of the operation cycle in the control section 15. For this reason, as shown by an arrow Y2, the difference between the q-axis high-speed update command value iq*_fst and the q-axis actual current value iq is smaller than the difference between the q-axis current command value iq* and the q-axis actual current value iq, which is shown by an arrow Y. That is, when the q-axis current command value iq* is updated at a high speed, thereby being made the q-axis high-speed update command value iq*_fst, whereby the difference between the q-axis high-speed update command value iq*_fst and the q-axis actual current value iq can be improved.

Here, FIG. 7 shows the q-axis current command value iq*, the q-axis high-speed update command value iq*_fst, and the q-axis actual current value iq at the time of the plus torque, but this is ditto for the case of other quadrant and for the d-axis current.

As shown in FIG. 6, the d-axis high-speed update command value id*_fst and a q-axis high-speed update command value iq*_fst, which are calculated in the high-speed update part 41, are outputted to the current estimation part 30 and are used for operating the d-axis current estimated value id_est and the q-axis current estimated value iq_est. Describing in more detail, the d-axis high-speed update command value id*_fst and the q-axis high-speed update command value iq*_fst are inversely dq transformed by the inverse dq transformation part 311 to thereby calculate the V phase current command value iv*_fst. The calculated V phase current command value iv*_fst is used for calculating the sensor phase basic current phase θx in the phase sensing part 312. When the β-axis current estimated value id_est used for calculating the sensor phase basic current phase θx is calculated by the use of the V phase current command value iv*_fst and the sensor phase current sensed value iw_sns, the following equation (16) is acquired.

[Mathematical formula 11]

$$i\beta\_est = K \times \left(-\sqrt{3} \times iv^*\_fst - \frac{\sqrt{3}}{2} \times iw\_sns\right) \quad (16)$$

As shown by the equation (16), the β-axis current estimated value iβ_est used for calculating the sensor phase basic current phase θx is calculated by the use of the V phase current command value iv*_fst, which is based on the d-axis high-speed update command value id*_fst and the q-axis high-speed update command value iq*_fst which are updated at the high speed, and the sensor phase current sensed value iw_sns. In this way, it is possible to reduce the effect of a sudden change in the torque command value trq* to the phase calculation of calculating the sensor phase basic current phase θx when the d-axis current command value id* and the q-axis current command value iq* are suddenly changed by the sudden change in the torque command value trq*. Further, since the accuracy of estimating the d-axis current estimated value id_est and the q-axis current estimated value iq_est is improved, it is possible to prevent a sudden change in each of the d-axis voltage command value vd* and the q-axis command value vq* which are calculated by feeding back the d-axis current estimated value id_est and the q-axis current estimated value iq_est, respectively.

Here, the whole of the control processing of the AC motor 2 according to the present embodiment will be described on the basis of FIG. 8. Here, it is assumed that this control processing is performed at specified intervals when the electric power of the electric motor drive system 1 is on.

In a first step S101 (hereinafter, "step" is omitted and is simply designated by a symbol "S"), the sensor phase current sensed value iw_sns is acquired from the current sensor 13. Further, the electric angle θe of the AC motor 2 is acquired from the rotation angle sensor 14.

In S102, the current command value operation part 21 calculates the d-axis current command value id* and the q-axis current command value iq* from the torque command value trq*. Here, the torque command value trq* is operated in the command update cycle Cd which is longer in the cycle than the present processing, so that in a period in which the torque command value trq* is not changed, the d-axis current command value id* and the q-axis current command value iq*, which are calculated in S102, are held at the same values. In other words, the d-axis current command value id* and the q-axis current command value iq* are updated in the command update cycle Cd.

In S103, the high-speed update part 41 updates the d-axis current command value id* and the q-axis current command value iq* at a high speed to thereby calculate the d-axis high-speed update command value id*_fst and the q-axis high-speed update command value iq*_fst.

In S104, the inverse dq transformation part 311 calculates three phase current command values iu*, iv*, iw* for calculating the sensor phase basic current phase θx by the inverse dq transformation on the basis of the d-axis high-speed update command value id*_fst and the q-axis high-speed update command value iq*_fst. In the present embodiment, of the three phase current command values, only the V phase current command value iv* is calculated.

In S105, the phase sensing part 312 calculates the α-axis current sensed value iα_sns and the β-axis current sensed value iβ_sns and performs the operation of the equation (8) to thereby calculate the sensor phase basic current phase θx. Further, the other phase estimation part 321 performs the operation of the equation (11) to thereby calculate the estimation phase current estimated value (reference value) iu_est_ref and calculates the estimation phase current estimated value (fixed value) iu_est_fix interpolated in a zero crossing manner by the zero crossing interpolation part 33.

In S106, the dq transformation part 34 calculates the d-axis current estimated value id_est and the q-axis current esti-mated value iq_est by the dq transformation on the basis of the estimation phase current estimated value (fixed value) iu_est_fix, which is interpolated in the zero crossing manner, the sensor phase current sensed value iw_sns, and the electric angle θe.

In S107, the subtracter 22 calculates the d-axis current deviation Δid and the q-axis current deviation Δiq on the basis of the d-axis current command value id* and the q-axis current command value iq* and the d-axis current estimated value id_est and the q-axis current estimated value iq_est, which are fed back. Then, the PI operation part 23 calculates the d-axis voltage command value vd* and the q-axis voltage command value vq* by the PI operation in such a way that the d-axis current deviation Δid and the q-axis current deviation Δiq converge to 0.

In S108, the inverse dq transformation 24 inversely dq transforms the d-axis voltage command value vd* and the q-axis voltage command value vq* to thereby calculate the three phase voltage command values vu*, vv*, vw*.

In S109, the PWM signal generation part 25 calculates the PWM signals UU, UL, VU, VL, WU, WL by the PWM modulation on the basis of the three phase voltage command values vu*, w*, vw* and the system voltage VH.

In S110, the calculated PWM signals UU, UL, VU, VL, WU, WL are outputted to the inverter 12, and the switching elements of the inverter 12 are switched on and off on the basis of the outputted PWM signals UU, UL, VU, VL, WU, WL.

In S111, the three phase AC voltages vu, w, vw generated when the switching elements of the inverter 12 are switched on and off on the basis of the outputted PWM signals UU, UL, VU, VL, WU, WL are impressed on the AC motor 2.

In S112, when the three phase AC voltages vu, w, vw are impressed on the AC motor 2, the AC motor 2 generates a desired torque based on the torque command value trq*.

As described above in detail, the electric motor control device 10 of the AC motor 2 controls the drive of the three-phase AC motor 2 in which the three-phase AC voltages vu, w, vw impressed thereon is controlled by the inverter 12.

In the control section 15 of the electric motor control device 10 is performed the following processing. The sensor phase current sensed value iw_sns is acquired in the sensor phase current sensing cycle Cs from the current sensor 13 disposed in the sensor phase (W phase in the present embodiment) of any one phase of the AC motor 2 (S101 in FIG. 8). Further, the electric angle θe is acquired from the rotation angle sensor 14 for sensing the rotation angle of the AC motor 2 (S101).

The current command value operation part 21 updates the d-axis current command value id* and the q-axis current command value iq*, which are current command values relating to the drive of the AC motor 2, in the command update cycle Cd which is longer in cycle than the sensor phase current sensing cycle Cs (102). Further, the current estimation part 30 calculates the d-axis current estimated value id_est and the q-axis current estimated value iq_est on the basis of the sensor phase current sensed value iw_sns, the electric angle θe, and the d-axis current command value id* and the q-axis current command value iq* (S106).

Describing in more detail, in the present embodiment, the sensor phase basic current phase sensing part 31 of the current estimation part 30 calculates the sensor phase basic current phase θx on the basis of the sensor phase current sensed value iw_sns, the electric angle θe, and the d-axis high-speed update command value id*_fst and the q-axis high-speed update command value iq*_fst, which are calculated by updating the d-axis current command value id* and the q-axis current command value iq* at the high speed. The fundamental wave estimation part 32 calculates the estimation phase current estimated value iu_est on the basis of the calculated sensor phase basic current phase θx and the sensor phase current sensed value iw_sns. Further, the zero crossing interpolation part 33 interpolates the estimation phase current estimated value iu_est in the zero crossing manner to thereby calculate the estimation phase current estimated value (fixed value) iu_est_fst. The dq transformation part 34 calculates the d-axis current estimated value id_est and the q-axis current estimated value iq_est on the basis of the estimation phase current estimated value (fixed value) iu_est_fst, the sensor phase current sensed value iw_sns, and the electric angle θe. The dq transformation 34 can be also thought as "an estimated value calculation part".

Here, if the d-axis current estimated value id_est and the q-axis current estimated value iq_est are calculated on the basis of the sensor phase current sensed value iw_sns, the electric angle θe, and the d-axis current command value id* and the q-axis current command value iq*, the d-axis current estimated value id_est and the q-axis current estimated value iq_est may be calculated by any method or may be calculated by the use of the other parameters.

The PI operation part 23 calculates the d-axis voltage command value vd* and the q-axis voltage command value vq* on the basis of the d-axis current command value id* and the q-axis current command value iq* and the d-axis current estimated value id_est and the q-axis current estimated value iq_est, which are fed back (S107). In the present embodiment, the d-axis voltage command value vd* and the q-axis voltage command value vq* are calculated in the cycle equal to the sensor phase current sensing cycle Cs. Then, the PI operation part 23 generates the PWM signals UU, UL, VU, VL, WU, WL relating to the drive of the AC motor 2 on the basis of the d-axis voltage command value vd* and the q-axis voltage command value vq* (S109). When the inverter 12 is driven on the basis of the PWM signals UU, UL, VU, VL, WU, WL, the inverter 12 generates the three-phase AC voltages vu, w, vw (S110). Then, when the generated three-phase AC voltages vu, w, vw are impressed on the AC motor 2 (S111), the AC motor 2 is driven, whereby the desired torque is generated (S112).

In the present embodiment, the current sensor 13 is disposed in only the W phase, and the d-axis current estimated value id_est and the q-axis current estimated value iq_est, which are to be fed back, are calculated on the basis of the sensor phase current sensed value iw_sns, the electric angle θe, and the d-axis current command value id* and the q-axis current command value iq*. Then, the drive of the AC motor 2 is controlled on the basis of the d-axis current estimated value id_est and the q-axis current estimated value iq_est. In this way, the number of the current sensors 13 can be reduced. By reducing the number of the current sensors 13, the inverter 12 can be reduced in size near the three-phase output terminals thereof and the electric motor control device 10 can be reduced in cost.

In addition, in the present embodiment, the estimation phase current estimated value iu_est, which is the current of the other phase, is estimated on the basis of the sensor phase current sensed value iw_sns, which is the current sensed value of one phase (W phase). In the conventional control system of the AC motor using a plurality of current sensors, a gain error is likely caused between the current sensors. However, in the present embodiment, the estimation phase current estimated value iu_est, which is the current of the other phase, is estimated on the basis of the sensor phase current sensed value iw_sns sensed by one current sensor 13, which can hence eliminate the effect of the gain error of the current sensors. In this way, in the AC motor 2, variations in the output torque which are caused by the gain error of the current sensor can be eliminated. This can hence eliminate, for example, vehicle vibrations in the case of the vehicle and hence can eliminate an element to degrade the merchantability of the vehicle.

Furthermore, the d-axis current command value id* and the q-axis current command value iq* are calculated on the basis of a higher command value such as the torque command value trq* and the like. Hence, when the update cycle of the torque command value trq* is long, the update cycle of the d-axis current command value id* and the q-axis current command value iq* is also long. Furthermore, there is a case where the higher command value such as the torque command value trq* is suddenly changed by an external factor, for example, depressing the accelerator pedal. In this case, the d-axis current command value id* and the q-axis current command value iq* are also suddenly changed. On the other hand, the sensor phase current sensed value iw_sns and the electric angle θe are short in the update cycle and are based on the actual behavior of the AC motor 2 and hence are continuously changed under normal conditions. The d-axis current estimated value id_est and the q-axis current estimated value iq_est are calculated on the basis of the d-axis current command value id* and the q-axis current command value iq*, which are long in the update period, and the sensor phase current sensed value iw_sns and the electric angle θe, which are short in the update period, that is, information different in property of the update period. In particular in the present embodiment, the d-axis voltage command value vd* and the q-axis voltage command value vq* are calculated in the sensor phase current sensing cycle Cs, which is shorter than the command update cycle Cd, on the basis of the d-axis current command value id* and the q-axis current command value iq* and the d-axis current estimated value id_est and the q-axis current estimated value iq_est, which are fed back. As described above, the d-axis current command value id* and the q-axis current command value iq*, which are long in the update period, are used for calculating the d-axis current estimated value id_est and the q-axis current estimated value iq_est, which are fed back. Hence, when the d-axis current command value id* and the q-axis current command value iq* are suddenly changed, the d-axis voltage command value vd* and the q-axis voltage command value vq* are likely to be suddenly changed.

Hence, the present embodiment prevents the d-axis voltage command value vd* and the q-axis voltage command value vq* from being suddenly changed by the d-axis current estimated value id_est and the q-axis current estimated value iq_est, which are fed back, being suddenly changed by the sudden change in the d-axis current command value id* and the q-axis current command value iq*. Specifically, the d-axis current command value id* and the q-axis current command value iq*, which are used for calculating the d-axis current estimated value id_est and the q-axis current estimated value iq_est, are changed (S103).

In this way, the d-axis voltage command value vd* and the q-axis voltage command value vq* are prevented from being suddenly changed, so that even if the d-axis current command value id* and the q-axis current command value iq* are suddenly changed, the three-phase AC voltages vu, w, vw to be impressed on the AC motor 2 can be prevented from being suddenly changed. Hence, the AC motor 2 can be stably driven.

More specifically, in the present embodiment, the control section 15 has the high-speed update part 41 and updates the d-axis current command value id* and the q-axis current command value iq* in the high-speed update cycle Ch which is shorter than the command update cycle Cd and calculates the d-axis high-speed update command value id*_fst and the q-axis high-speed update command value iq*_fst.

By updating the d-axis current command value id* at the high speed to thereby make the d-axis high-speed update command value id*_fst, the difference between the d-axis high-speed update command value id*_fst and the d-axis actual current value id can be improved. Similarly, by updating the q-axis current command value iq* at the high speed to thereby make the q-axis high-speed update command value iq*_fst, the difference between q-axis high-speed update command value iq*_fst and the q-axis actual current value iq can be improved. In this way, the accuracy of sensing the sensor phase basic current phase θx is improved and hence the accuracy of estimating the d-axis current estimated value id_est and the q-axis current estimated value iq_est can be improved. Furthermore, since the accuracy of estimating the d-axis current estimated value id_est and the q-axis current estimated value iq_est is improved, even in the case where the d-axis current command value id* and the q-axis current command value iq* are suddenly changed, the d-axis voltage command value vd* and the q-axis voltage command value vq* are prevented from being suddenly changed. Hence, the AC motor 2 can be stably driven.

In particular, in the present embodiment, the high-speed update cycle Ch, which is the update cycle of the d-axis high-speed update command value id*_fst and the q-axis high-speed update command value iq*_fst, is equal to the sensor phase current sensing cycle Cs which is the sensing cycle of the sensor phase current sensed value iw_sns. For this reason, the difference between the d-axis high-speed update command value id*_fst and the d-axis actual current value id can be improved. Similarly, the difference between the q-axis high-speed update command value iq*_fst and the q-axis actual current value iq can be improved. In this way, the accuracy of sensing the sensor phase basic current phase θx is improved and the accuracy of estimating the d-axis current estimated value id_est and the q-axis current estimated value iq_est is also further improved. Since the accuracy of estimating the d-axis current estimated value id_est and the q-axis current estimated value iq_est, which are fed back, is further improved, even in the case where the d-axis current command value id* and the q-axis current command value iq* are suddenly changed, the d-axis voltage command value vd* and the q-axis voltage command value vq* are further prevented from being suddenly changed. Hence, the AC motor 2 can be stably driven.

In the present embodiment, the control section 15 constructs "a current acquisition device", "a rotation angle acquisition device", "a current command value operation device", "a current estimation device", "a voltage command value operation device", "a drive signal generation device", "a sudden change prevention device", and "a current command value change device". Describing in more detail, the current estimation part 30 constructs "the current acquisition device", "the rotation angle acquisition device", and "the current estimation device", and the current command value operation part 21 constructs "the current command value operation device", and the PI operation part 23 constructs "the voltage command value operation device", and the PWM signal generation part 25 constructs "the drive signal generation device", and the high-speed update part 41 constructs "the sudden change prevention device" and "the current command value change device".

Figure 8:
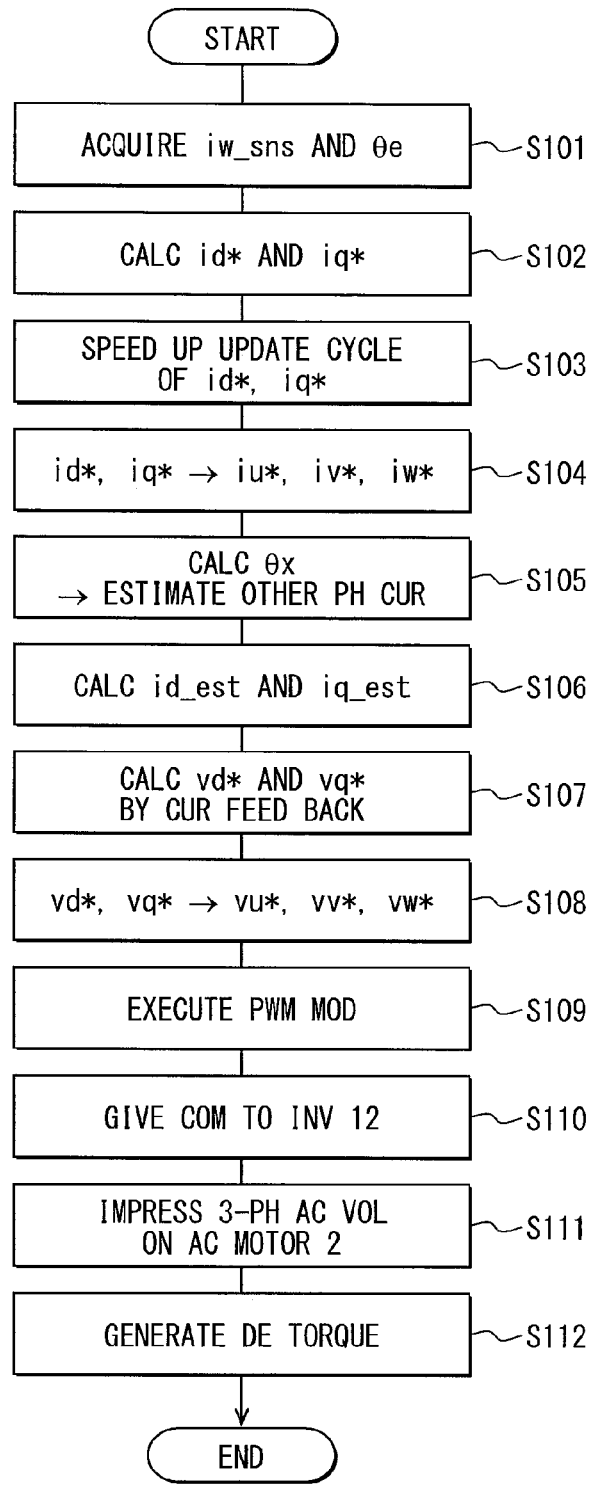
FIG. 8 is a flow chart to show a control processing of an AC motor according to the first embodiment of the present invention.

Further, S101 in FIG. 8 corresponds to a processing as the function of "the current acquisition device" and "the rotation angle acquisition device", and S102 corresponds to a processing as the function of "the current command value operation device", and S104 to S106 correspond to a processing as the function of "the current estimation device", and S107 corresponds to a processing as the function of "the voltage command value operation device", and S109 corresponds to a processing as the function of "the drive signal generation device", and S103 corresponds to a processing as the function of "the sudden change prevention device", and "the current command value change device".

Still further, in the present embodiment, the W phase corresponds to "the sensor phase", and the electric angle θe corresponds to "the rotation angle sensed value". Still further, the d-axis current command value id* and the q-axis current command value iq* correspond to "the current command value", and the d-axis current estimated value id_est and the q-axis current estimated value iq_est correspond to "the current estimated value", and the d-axis voltage command value vd* and the q-axis voltage command value vq* correspond to "the voltage command value", and the PWM signals UU, UL, VU, VL, WU, WL correspond to "the drive signal".

Second Embodiment

A control device of an AC motor according to a second embodiment of the present invention will be described on the basis of FIG. 9. The present embodiment is the same as the first embodiment except for the arrangement of the high-speed update part 42, so that the descriptions of the other constructions and processings will be omitted. A processing performed by the high-speed update part 42 of the present embodiment is the same as the processing in the high-speed update part 41 of the first embodiment.

In the high-speed update part 41 of the first embodiment, the d-axis high-speed update command value id*_fst and the q-axis high-speed update command value iq*_fst, which are acquired by updating the d-axis current command value id* and the q-axis current command value iq*, are used only for the operation in the current estimation part 30. In the second embodiment, the d-axis high-speed update command value id*_fst and the q-axis high-speed update command value iq*_fst, which are calculated by the high-speed update part 42, are used for all of the control performed by the control section 15. In other words, not only the d-axis current estimated value id_est and the q-axis current estimated value iq_est but also the d-axis voltage command value vd* and the q-axis voltage command value vq* are calculated on the basis of the d-axis high-speed update command value id*_fst and the q-axis high-speed update command value iq*_fst.

In other words, in the present embodiment, the d-axis voltage command value vd* and the q-axis voltage command value vq* are calculated on the basis of the d-axis high-speed update command value id*_fst and the q-axis high-speed update command value iq*_fst, which are the current command values operated in the high-speed update cycle Ch shorter than the command update cycle Cd which is the operation cycle of the d-axis current command value id* and the q-axis current command value iq*.

This construction can also produce the same effects as the embodiment described above.

In this regard, in the present embodiment, the high-speed update part 42 constructs "the sudden change prevention device" and "the current command value change device".

Third Embodiment

A control device of an AC motor according to a third embodiment of the present invention will be described on the basis of FIG. 10 to FIG. 12. The present embodiment is different from the first embodiment in a point that: the control device is provided with a low pass filter (hereinafter referred to as "LPF") processing par 43 in place of the high-speed update part 41 of the first embodiment. Here, the point that the third embodiment is different from the first embodiment will be mainly described and the descriptions of the same constructions and processings as the first embodiment will be omitted.

Figure 10:
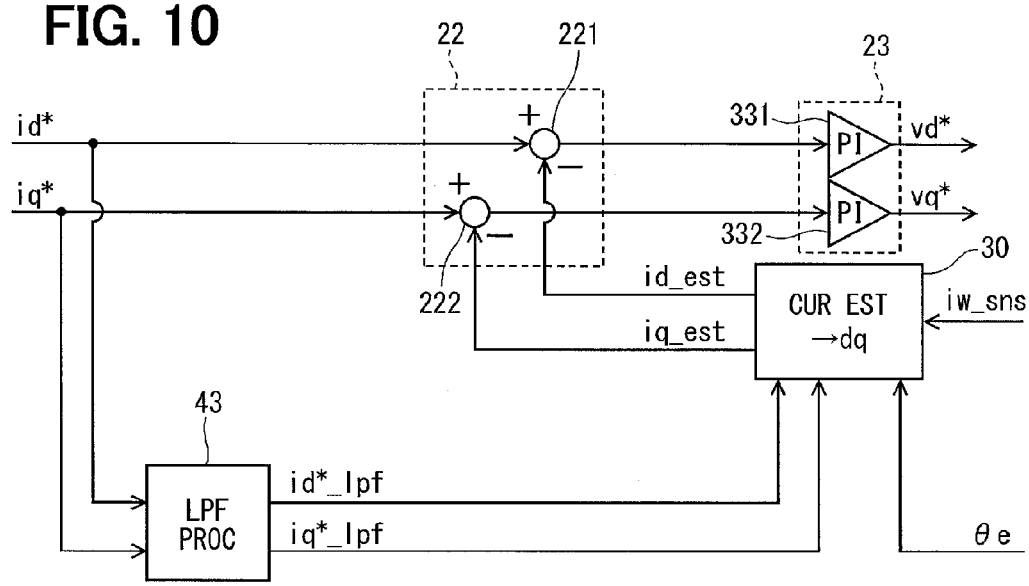
FIG. 10 is a block diagram to illustrate a sudden change prevention device according to a third embodiment of the present invention.

As shown in FIG. 10, in the present embodiment, the control section 15 has the LPF processing part 43 so as to decrease the difference between the d-axis current command value id* and the d-axis actual current value (sensor sensed value) id and the difference between the q-axis current command value iq* and the q-axis actual current value (sensor sensed value) iq.

The LPF processing part 43 subjects the d-axis current command value id* calculated by the current command value operation part 21 to an LPF processing to thereby calculate a d-axis LPF processing command value id*_lpf. Similarly, the LPF processing part 43 subjects the q-axis current command value iq* calculated by the current command value operation part 21 to the LPF processing to thereby calculate a q-axis LPF processing command value iq*_lpf. An LPF time constant in the LPF processing part 43 can be set appropriately on the basis of an actual responsivity, a circuit constant, and the like.

Figure 11:
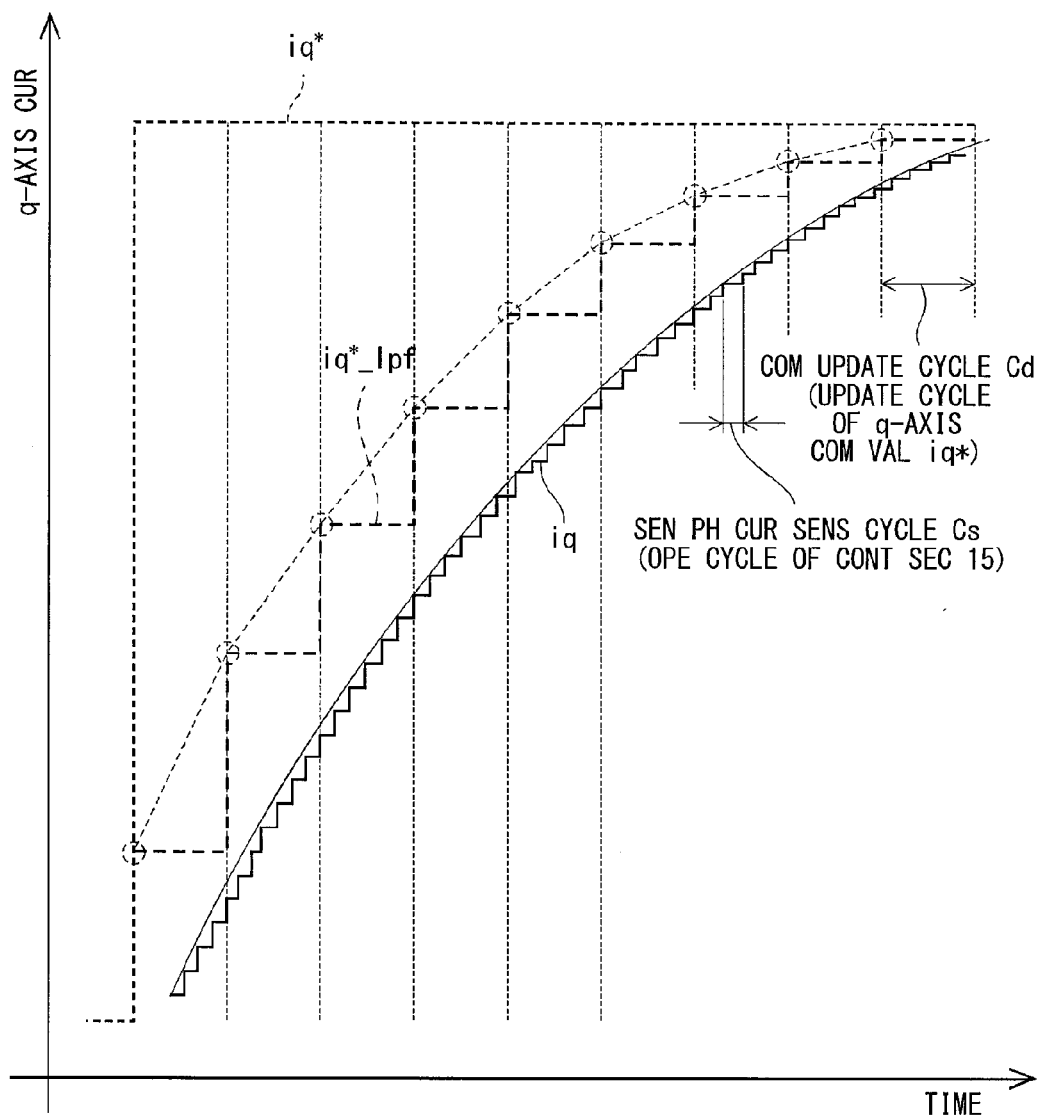
FIG. 11 is a chart to illustrate the sudden change prevention device according to the third embodiment of the present invention.

FIG. 11 shows the q-axis current command value iq*, the q-axis LPF processing command value iq*_lpf, and the q-axis actual current value iq at the time of the plus torque and shows an example in which after the q-axis current command value iq* is suddenly changed, the q-axis current command value iq* is held at the same value. As shown in FIG. 11, the difference between the q-axis current command value iq* and the q-axis actual current value iq is smaller than the difference between the q-axis current command value iq* not subjected to the LPF processing and the q-axis actual current value iq. That is, when the q-axis current command value iq* is subjected to the LPF processing to thereby make the q-axis LPF processing command value iq*_lpf, the difference between the q-axis LPF processing command value iq*_lpf and the q-axis actual current value iq can be decreased.

In this regard, FIG. 11 shows the q-axis current command value iq*, the q-axis LPF processing command value iq*_lpf, and the q-axis actual current value iq at the time of the plus torque. However, this is ditto for the other quadrant and for the d-axis current.

As shown in FIG. 10, the d-axis LPF processing command value id*_lpf and the q-axis LPF processing command value iq*_lpf, which are acquired respectively by subjecting the d-axis current command value id* and the q-axis current command value iq* to the LPF processing by the LPF processing part 43, are outputted to the current estimation part 30 and are used for operating the d-axis current estimated value id_est and the q-axis current estimated value iq_est. Describing in more detail, the d-axis LPF processing command value id*_lpf and the q-axis LPF processing command value iq*_lpf are inversely dq transformed by the inverse dq transformation part 311 to thereby calculate a V phase current command value iv*_lpf. The calculated V phase current command value iv*_lpf is used for calculating the sensor phase basic current phase θx in the phase sensing part 312. When the β-axis current estimated value iβ_est used for calculating the sensor phase basic current phase θx is calculated on the basis of the V phase current command value iv*_lpf and the sensor phase current sensed value iw_sns, the following equation (17) can be acquired.

[Mathematical formula 12]

$$i\beta\_est = K \times \left(-\sqrt{3} \times iv^*\_lpf - \frac{\sqrt{3}}{2} \times iw\_sns\right) \quad (17)$$

As shown in the equation (17), the β-axis current estimated value iβ_est used for calculating the sensor phase basic current phase θx is calculated by the use of the V phase current command value iv*_lpf based on the d-axis LPF processing command value id*_lpf and the q-axis LPF processing command value iq*_lpf, which are acquired respectively by subjecting the d-axis current command value id* and the q-axis current command value iq* to the LPF processing by the LPF processing part 43, and the sensor phase current sensed value iw_sns. This can reduce the effect of a sudden change in the torque command value trq* to the phase calculation of the calculation of the sensor phase basic current phase θx when the d-axis current command value id* and the q-axis current command value iq* are suddenly changed by the sudden change in the torque command value trq*. Further, since the accuracy of estimating the d-axis current estimated value id_est and the q-axis current estimated value iq_est is improved, it is possible to prevent the d-axis voltage command value vd* and the q-axis voltage command value vq*, which are calculated by feeding back the d-axis current estimated value id_est and the q-axis current estimated value iq_est, from being suddenly changed, respectively.

In this regard, when the d-axis LPF processing command value id*_lpf and the q-axis LPF processing command value iq*_lpf are used for all of the control of the control section 15 like the second embodiment, the actual responsivity is further delayed with respect to the responsivity of the AC motor 2 required by the vehicle control circuit 9 of a higher level. Hence, the d-axis LPF processing command value id*_lpf and the q-axis LPF processing command value iq*_lpf are not used for operating the d-axis voltage command value vd* and the q-axis voltage command value vq* but only for the operation in the current estimation part 30.

Here, all of the control processing of the AC motor 2 according to the present embodiment will be described on the basis of FIG. 12. The control processing in the present embodiment is different from the control processing of the first embodiment shown in FIG. 8 only in an operation performed after the d-axis current command value id* and the q-axis current command value iq* are calculated, so that only the processing of S203 performed in place of S103 will be described and the descriptions of the other steps will be omitted.

In S203 performed after S102, the LPF processing part 43 subjects the d-axis current command value id* and the q-axis current command value iq* to the LPF processing to thereby calculate the d-axis LPF processing command value id*_lpf and the q-axis LPF processing command value iq*_lpf, and then the procedure proceeds to S104.

The present embodiment prevents the d-axis voltage command value vd* and the q-axis voltage command value vq* from being suddenly changed by the d-axis current estimated value id_est and the q-axis current estimated value iq_est, which are fed back, being suddenly changed by the sudden change in the d-axis current command value id* and the q-axis current command value iq*. Specifically, the present embodiment changes the d-axis current command value id* and the q-axis current command value iq*, which are used for calculating the d-axis current estimated value id_est and the q-axis current estimated value iq_est.

In this way, the same effects as the embodiments described above can be produced.

More specifically, the control section 15 has the LPF processing part 43 and the LPF processing part 43 subjects the d-axis current command value id* and the q-axis current command value iq* to the LPF processing by the LPF processing part 43 to thereby calculate the d-axis LPF processing command value id*_lpf and the q-axis LPF processing command value iq*_lpf. By subjecting the d-axis current command value id* to the LPF processing by the LPF processing part 43 to thereby calculate the d-axis LPF processing command value id*_lpf, the difference between the d-axis LPF processing command value id*_lpf and d-axis actual current value id can be decreased. Similarly, by subjecting the q-axis current command value iq* to the LPF processing by the LPF processing part 43 to thereby calculate the q-axis LPF processing command value iq*_lpf, the difference between the q-axis LPF processing command value iq*_lpf and q-axis actual current value iq can be decreased. In this way, the accuracy of sensing the sensor phase basic current phase θx is improved and hence the accuracy of estimating the d-axis current estimated value id_est and the q-axis current estimated value iq_est is improved. Further, since the accuracy of estimating the d-axis current estimated value id_est and the q-axis current estimated value iq_est, which are fed back, is improved, even in the case where the d-axis current command value id* and the q-axis current command value iq* are suddenly changed, the d-axis voltage command value vd* and the q-axis voltage command value vq* are prevented from being suddenly changed. Hence, the AC motor 2 can be stably driven.

In this regard, in the present embodiment, the LPF processing part 43 constructs to "the sudden change prevention device" and "the current command value change device". Further, S203 in FIG. 12 corresponds to a processing as the function of "the sudden change prevention device" and "the current command value change device".

Fourth Embodiment

Figure 13:
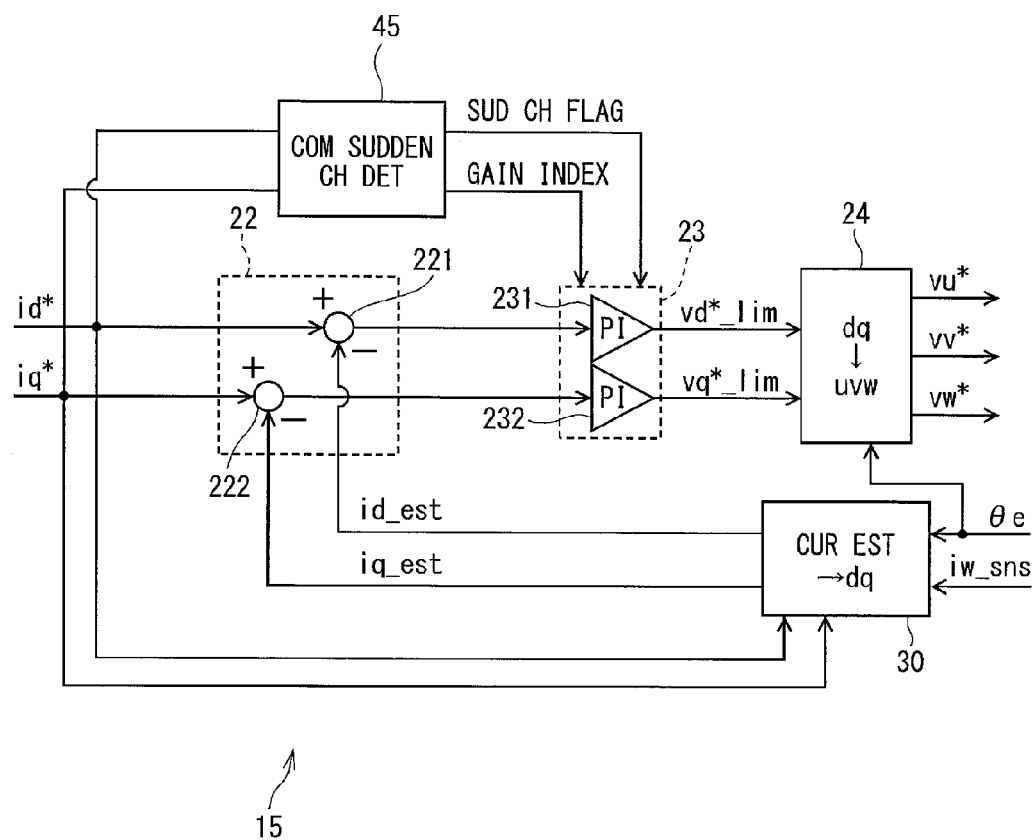
FIG. 13 is a block diagram to illustrate a sudden change prevention device according to a fourth embodiment of the present invention.

A control device of an AC motor according to a fourth embodiment of the present invention will be described on the basis of FIG. 13 and FIG. 14. The present embodiment is different from the first embodiment in a point that: the control device is not provided with the high-speed update part 41 of the first embodiment; but is provided with a command sudden change determination part 45. Here, the point that the fourth embodiment is different from the first embodiment will be mainly described and the descriptions of the same constructions and processings as the first embodiment will be omitted.

In the present embodiment, in order to prevent the d-axis voltage command value vd* and the q-axis voltage command value vq* from being suddenly changed by the sudden change in the d-axis current command value id* and the q-axis current command value iq*, the control section 15 has the command sudden change determination part 45. In the case where the difference between a value of the last time and a value of this time of each of the d-axis current command value id* and the q-axis current command value iq* is not less than a specified threshold value, the command sudden change determination part 45 determines that the d-axis current command value id* and the q-axis current command value iq* are suddenly changed. In this regard, the specified threshold value relating to the determination of the sudden change is a value determined by the responsivity of the AC motor 2 and by the operation speed of the control section 15 and can be set appropriately by, for example, an experiment result or a simulation result. Further, the determination of the sudden change may be made on the basis of only either of the d-axis current command value id* and the q-axis current command value iq*.

Further, in the case where the command sudden change determination part 45 determines that the d-axis current command value id* and the q-axis current command value iq* are suddenly changed, in order to reduce a feedback gain used for an PI operation operated by the PI operation part 23, the command sudden change determination part 45 sends a gain index, which relates to a reduction in the feedback gain, and a sudden change flag to the PI operation part 23.

Here, a reduction in the feedback gain in the PI operation part 23 will be described.

A d-axis PI operation part 231 of the PI operation part 23 performs an operation shown by an equation (18) by the use of feedback gains of KPd1 and KId1, and a q-axis PI operation part 232 of the PI operation part 23 performs an operation shown by an equation (19) by the use of feedback gains of KPq1 and KIq1.

[Mathematical formula 13]

$$PId = KPd1 \times \Delta id + KId1 \times \Sigma \Delta id \tag{18}$$

$$PIq = kPq1 \times \Delta iq + KIq1 \times \Sigma \Delta iq \tag{19}$$

In the case where the command sudden change determination part 45 determines that the d-axis current command value id* and the q-axis current command value iq* are suddenly changed, the feedback gains KPd2, KId2, KPq2, KIq2, which are used for the PI operation in the PI operation part 23, and the sudden change flag are sent from the command sudden change determination part 45 to the PI operation part 23. The magnitude relationship between feedback gains, which are sent when the command sudden change determination part 45 determines that the d-axis current command value id* and the q-axis current command value iq* are suddenly changed, are as follows: KPd2<KPd1, KId2<KId1, KPd2<KPq1, and KIq2<KIq1.

Furthermore, the d-axis PI operation part 231 of the PI operation part 23 performs an operation shown by an equation (20) by the use of the feedback gains KPd2 and KId2 sent from the command sudden change determination part 45, and the q-axis PI operation part 232 performs an operation shown by an equation (21) by the use of the feedback gains KPq2 and KIq2.

In this way, a d-axis voltage command value vd*_lim and a q-axis voltage command value vq*_lim, in which a sudden change is prevented, are calculated.

[Mathematical formula 14]

$$PId = KPd2 \times \Delta id + KId2 \times \Sigma \Delta id \tag{20}$$

$$PIq = KPq2 \times \Delta iq + KIq2 \times \Sigma iq \tag{21}$$

Here, all of the control processing of the AC motor 2 according to the present embodiment will be described on the basis of FIG. 14. In the control processing of the present embodiment, the processing of S103 in the control processing of the first embodiment shown in FIG. 8 is not performed but the processings of S120 to S122 are additionally performed between S106 and S107, which is different from the first embodiment. Hence, only the processings of S120 to S122 performed after S106 will be described and the descriptions of the other steps will be omitted.

In S120 to which the procedure proceeds after the d-axis current estimated value id_est and the q-axis current estimated value iq_est are calculated in S106, it is determined by the command sudden change determination part 45 whether or not the d-axis current command value id* and the q-axis current command value iq* are suddenly changed. If it is determined that the d-axis current command value id* and the q-axis current command value iq* are not suddenly changed (S120: NO), the procedure proceeds to S122. If it is determined that the d-axis current command value id* and the q-axis current command value iq* are suddenly changed (S120: YES), the sudden change flag and the gain index are sent to the PI operation part 23 and then the procedure proceeds to S121.

In S121, the feedback gains used for the PI operation in the PI operation part 23 are decreased on the basis of the gain index. Specifically, the feedback gains are changed to KPd2, Kld2, KPq2, Klq2.

In S122 to which the procedure proceeds if it is determined that the d-axis current command value id* and the q-axis current command value iq* are not suddenly changed (S120: NO), the feedback gains used for the PI operation in the PI operation part 23 are not changed. Specifically, KPd1, Kld1, KPq1, Klq1 are used as the feedback gains.

In S107 to which the procedure proceeds after S106, the PI operation part 23 calculates the d-axis voltage command value vd* and the q-axis voltage command value vq* by the PI operation by making the feedback gains KPd1, Kld1, KPq1, Klq1 or KPd2, Kld2, KPq2, Klq2. The d-axis voltage command value vd* and the q-axis voltage command value vq* calculated in this step are the d-axis voltage command value vd*_lim and the q-axis voltage command value vq*_lim, each of which is prevented from being suddenly changed.

In the present embodiment, the control section 15 of the electric motor control device 10 of the AC motor 2 has the command sudden change determination part 45 for determining whether or not the d-axis current command value id* and the q-axis current command value iq* are suddenly changed.

Figure 14:
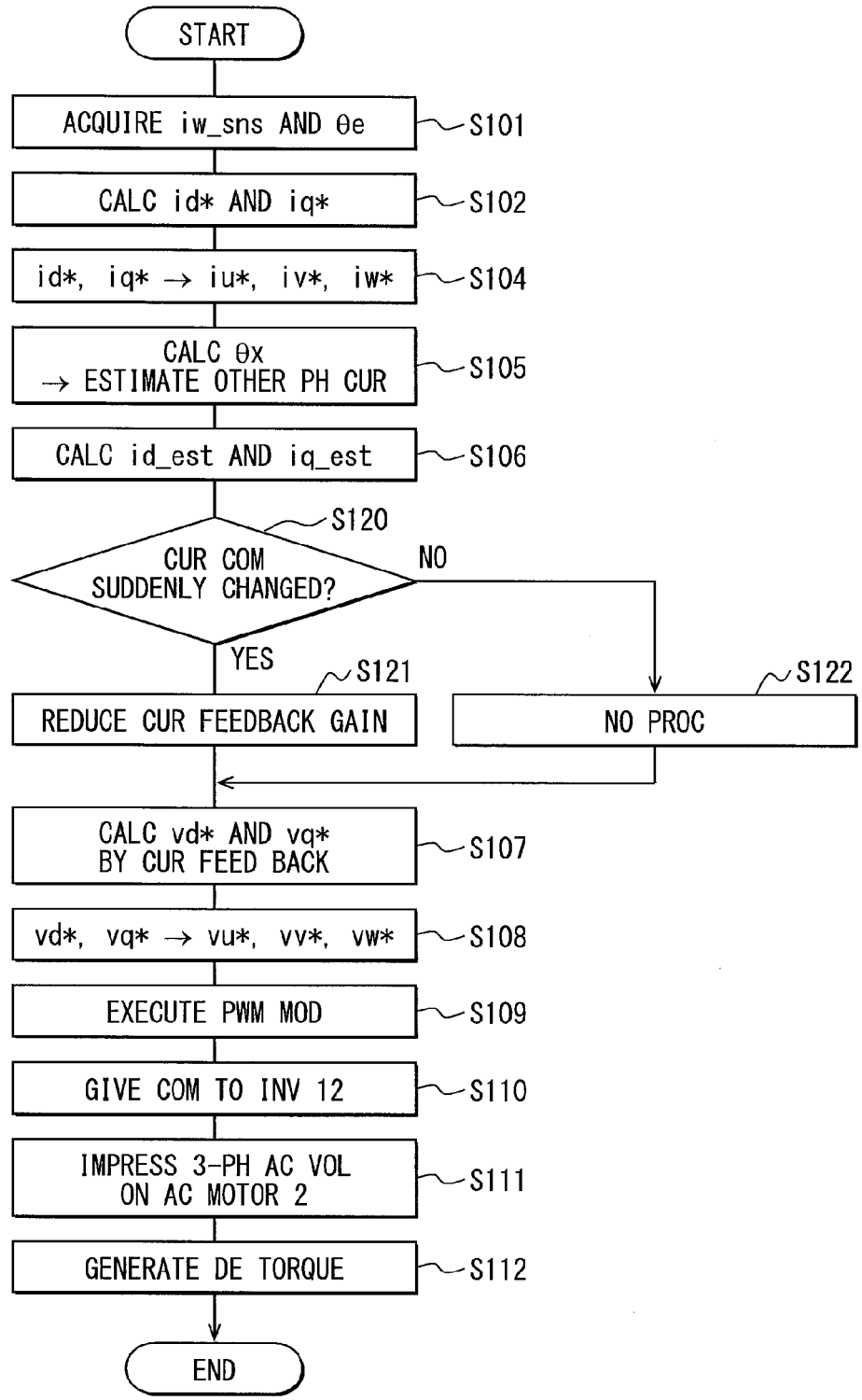
FIG. 14 is a flow chart to show a control processing of an AC motor according to the fourth embodiment of the present invention.

Further, if it is determined by the command sudden change determination part 45 that the d-axis current command value id* and the q-axis current command value iq* are suddenly changed (S120 of FIG. 14: YES), the feedback gains of the d-axis current estimated value id_est and the q-axis current estimated value iq_est, which are used for the operation of the d-axis voltage command value vd* and the q-axis voltage command value vq*, are decreased (S121).

In this way, even in the case where the d-axis current estimated value id_est and the q-axis current estimated value iq_est, which are to be fed back, are suddenly changed when the d-axis current command value id* and the q-axis current command value iq* are suddenly changed, by decreasing the feedback gains of the d-axis current estimated value id_est and the q-axis current estimated value iq_est, the d-axis voltage command value vd* and the q-axis voltage command value vq* can be prevented from being suddenly changed. Hence, the same effects as the embodiments described above can be produced.

In this regard, in the present embodiment, the command sudden change determination part 45 constructs "the sudden change determination part" and the PI operation part 23 constructs "the sudden change prevention device". Furthermore, S120 of FIG. 14 corresponds to a processing as the function of "the sudden change determination device" and S121 corresponds to a processing as the function of "the sudden change prevention device"

Fifth Embodiment

Figure 15:
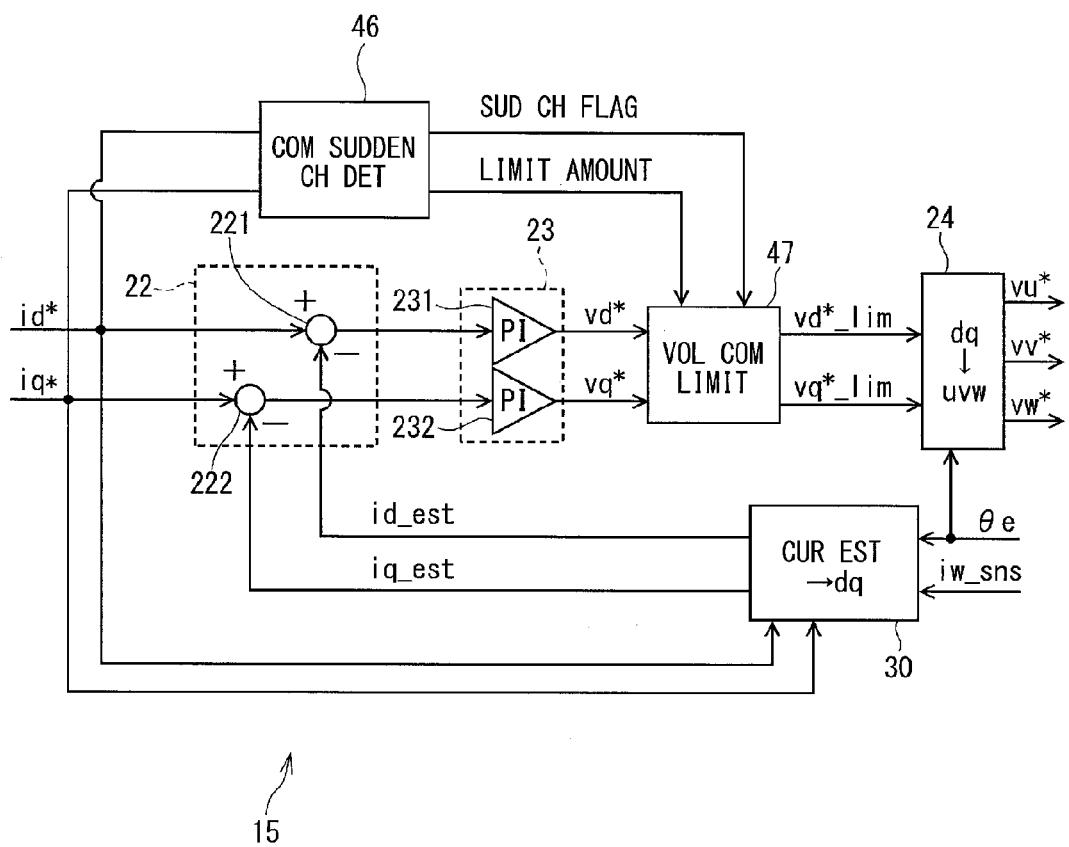
FIG. 15 is a block diagram to illustrate a sudden change prevention device according to a fifth embodiment of the present invention.

A control device of an AC motor according to a fifth embodiment of the present invention will be described on the basis of FIG. 15 and FIG. 16. The present embodiment is different from the first embodiment in a point that: the control device is not provided with the high-speed update part 41 of the first embodiment; but is provided with a command sudden change determination part 46 and a voltage command limitation part 47. Here, the point that the fourth embodiment is different from the first embodiment will be mainly described and the descriptions of the same constructions and processings as the first embodiment will be omitted.

In the present embodiment, in order to prevent the d-axis voltage command value vd* and the q-axis voltage command value vq* from being suddenly changed by a sudden change in the d-axis current command value id* and the q-axis current command value iq*, the control section 15 has the command sudden change determination part 46 and the voltage command limitation part 47.

In the case where the difference between a value of the last time and a value of this time of each of the d-axis current command value id* and the q-axis current command value iq* is not less than a specified threshold value, as is the case of the command sudden change determination part 45 of the fourth embodiment, the command sudden change determination part 46 determines that the d-axis current command value id* and the q-axis current command value iq* are suddenly changed. Further, in the case where the command sudden change determination part 46 determines that the d-axis current command value id* and the q-axis current command value iq* are suddenly changed, the command sudden change determination part 46 sends a sudden change flag and an amount of limit of a variation range of the d-axis voltage command value vd* and the q-axis voltage command value vq* to the voltage command limitation part 47.

The voltage command limitation part 47 is provided between the PI operation part 23 and the inverse dq transformation part 24. In the case where the voltage command limitation part 47 has the sudden change flag sent thereto from the command sudden change determination part 46, the voltage command limitation part 47 directly limits the variation range of the d-axis voltage command value vd* and the q-axis voltage command value vq* on the basis of the amount of limit of the variation range sent together with the sudden change flag and outputs the d-axis voltage command value vd*_lim and the q-axis voltage command value vq*_lim, each of which is prevented from being suddenly changed, to the inverse dq transformation part 24.

In this regard, in the embodiments described above, not by changing the d-axis voltage command value vd* and the q-axis voltage command value vq* themselves but by changing other parameters, the d-axis voltage command value vd* and the q-axis voltage command value vq* are prevented from being suddenly changed. In contrast to this, in the present embodiment, by changing the d-axis voltage command value vd* and the q-axis voltage command value vq* themselves, the d-axis voltage command value vd* and the q-axis voltage command value vq* are prevented from being suddenly changed. In other words, the variation range of the d-axis voltage command value vd* and the q-axis voltage command value vq* is directly limited.

Here, all of the control processing of the AC motor 2 according to the present embodiment will be described on the basis of FIG. 16. In the control processing of the first embodiment, the processing of S103 in the control processing of the first embodiment shown in FIG. 8 is not performed but the processings of S130 to S132 are additionally performed between S107 and S108, which is different from the control processing of the first embodiment. Hence, only the processings of S130 to S132 performed after S107 will be described and the descriptions of the other steps will be omitted.

In S130 to which the procedure proceeds after the d-axis voltage command value vd* and the q-axis voltage command value vq* are calculated in S107, the voltage command determination part 46 determines whether or not the d-axis current command value id* and the q-axis current command value iq* are suddenly changed. If it is determined that the d-axis current command value id* and the q-axis current command value iq* are not suddenly changed (S130: NO), the procedure proceeds to S132. If it is determined that the d-axis current command value id* and the q-axis current command value iq* are suddenly changed (S130: YES), the sudden change flag and the amount of limit of variation range are sent to the voltage command limitation part 47 and then the procedure proceeds to S131.

In S131, the voltage command limitation part 47 directly limits the variation range of the d-axis voltage command value vd* and the q-axis voltage command value vq* and calculates the d-axis voltage command value vd*_lim and the q-axis voltage command value vq*_lim each of which is prevented from being suddenly changed. Then, the procedure proceeds to S108.

In S132 to which the procedure proceeds if it is determined that the d-axis current command value id* and the q-axis current command value iq* are not suddenly changed (S130: NO), the variation range of the d-axis voltage command value vd* and the q-axis voltage command value vq* is not limited, and then the procedure proceeds to S108.

In S108, the three phase voltage command values vu*, w*, vw* are calculated by the inverse dq transformation on the basis of the d-axis voltage command value vd* and the q-axis voltage command value vq*. In this regard, if it is determined that S130 is affirmative and the d-axis voltage command value vd*_lim and the q-axis voltage command value vq*_lim, each of which is prevented from being suddenly changed, are calculated in S131, the d-axis voltage command value vd*_lim and the q-axis voltage command value vq*_lim, each of which is prevented from being suddenly changed, are used in place of the d-axis voltage command value vd* and the q-axis voltage command value vq*.

In the present embodiment, the control section 15 of the electric motor control device 10 of the AC motor 2 has the command sudden change determination part 46 for determining whether or not the d-axis current command value id* and the q-axis current command value iq* are suddenly changed.

Figure 16:
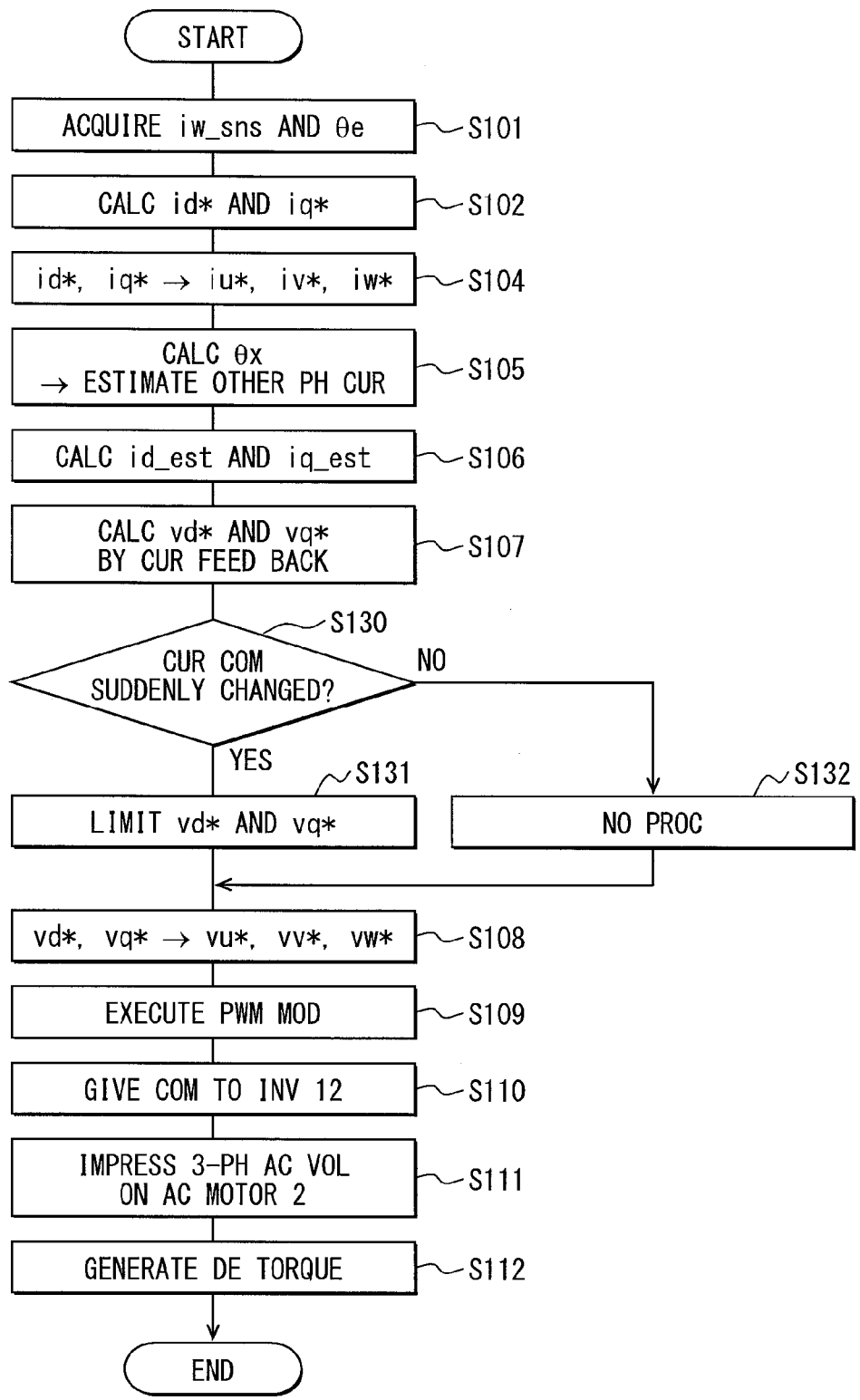
FIG. 16 is a flow chart to show a control processing of an AC motor according to the fifth embodiment of the present invention.

Further, if it is determined by the command sudden change determination part 46 that the d-axis current command value id* and the q-axis current command value iq* are suddenly changed (S130 of FIG. 16: YES), the command sudden change limitation part 47 directly limits the variation range of the d-axis voltage command value vd* and the q-axis voltage command value vq* (S131).

In this way, even in the case where the d-axis current estimated value id_est and the q-axis current estimated value iq_est, which are to be fed back, are suddenly changed by the sudden change in the d-axis current command value id* and the q-axis current command value iq*, the command sudden change limitation part 47 directly limits the variation range of the d-axis voltage command value vd* and the q-axis voltage command value vq* and hence can prevent the d-axis voltage command value vd* and the q-axis voltage command value vq* from being suddenly changed. Hence, the same effects as the embodiments described above can be produced.

In this regard, in the present embodiment, the command sudden change determination part 46 constructs "the sudden change determination part" and the voltage command limitation part 47 constructs "the sudden change prevention device". Furthermore, S130 of FIG. 16 corresponds to a processing as the function of "the sudden change determination device" and S131 corresponds to a processing as the function of "the sudden change prevention device".

OTHER EMBODIMENTS (A) The sudden change prevention device described in the first to fifth embodiments may be combined with each other. Specifically, of four patterns of (1) the high-speed update part 41 of the first embodiment or the high-speed update part 42 of the second embodiment, (2) the LPF processing part 43 of the third embodiment, (3) the command sudden change determination part 45 of the fourth embodiment, and (4) the command sudden change determination part 46 and the voltage command limitation part 47 of the fifth embodiment, a part or all of the four patterns may be combined with each other. In the case where (3) and (4) are employed, the command sudden change determination parts 45, 46 may be formed in one control block.

Figure 12:
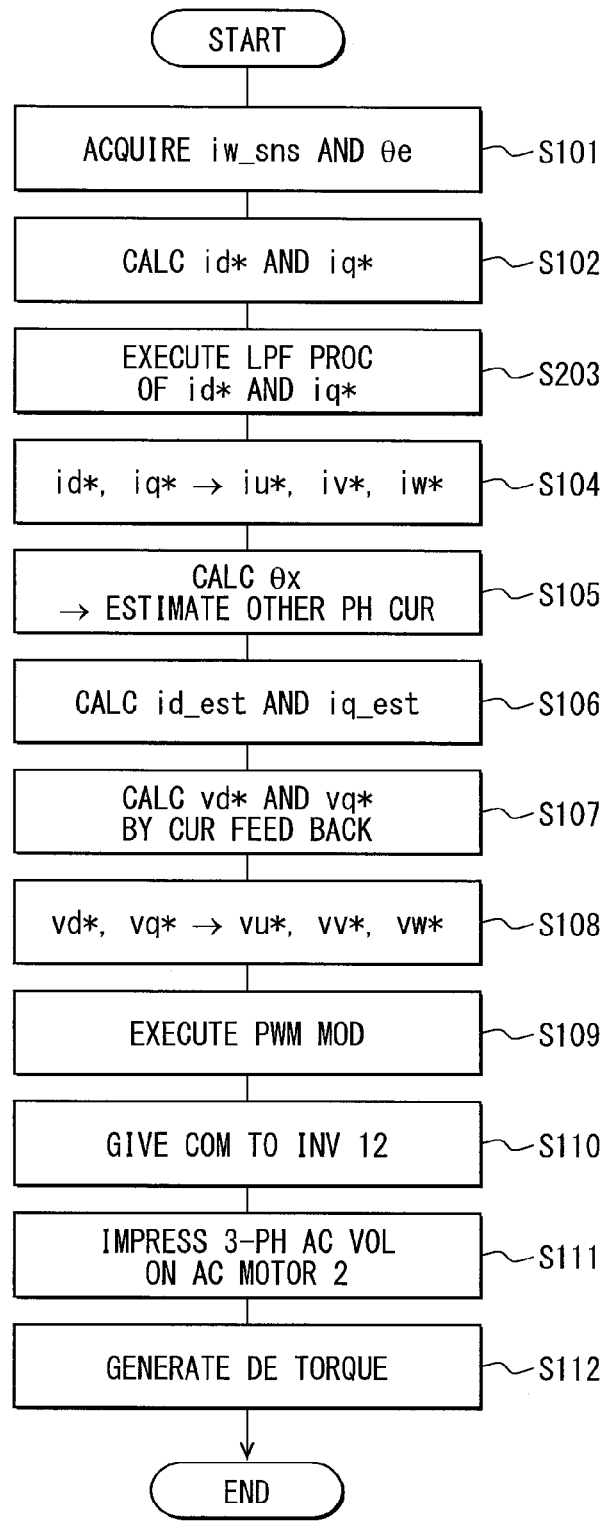
FIG. 12 is a flow chart to show a control processing of an AC motor according to the third embodiment of the present invention.

Furthermore, when a flow chart in the case where all of the four patterns (1) to (4) are combined with each other is described by way of an example, the processing of S203 shown in FIG. 12 is performed after S103 shown in FIG. 8 and then the procedure proceeds to S104. Further, the processings of S120 to S112 shown in FIG. 14 are performed after S106 shown and then the procedure proceeds to S107. Still further, the processings of S130 to S132 shown in FIG. 16 are performed after S107.

(B) The high-speed update processing of the first embodiment and the second embodiment and the LPF processing of the third embodiment may be performed only in the case where the d-axis current command value id* and the q-axis current command value iq* are suddenly changed.

Figure 9:
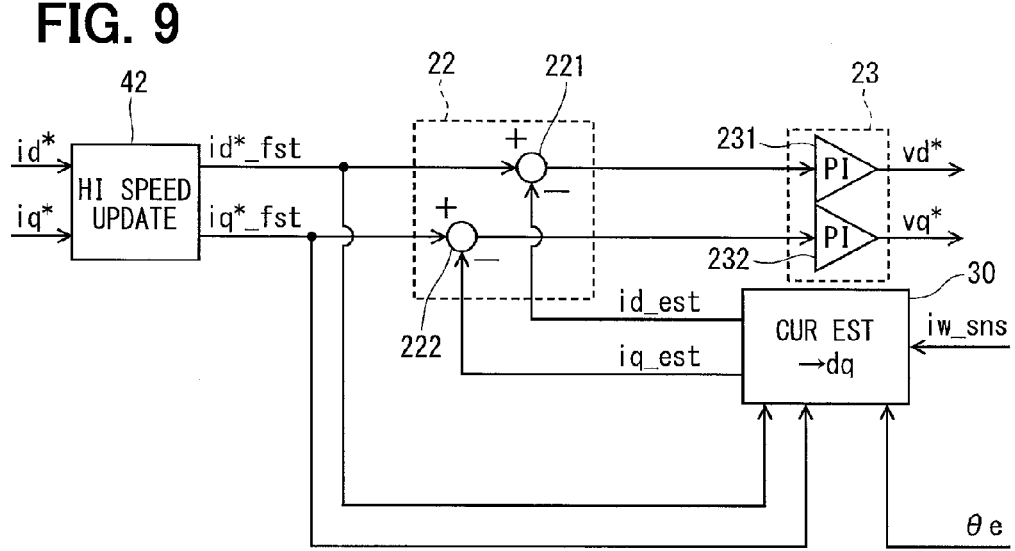
FIG. 9 is a block diagram to illustrate a sudden change prevention device according to a second embodiment of the present invention.

Specifically, for example, the same command sudden change determination part as the command sudden change determination part 45 of the fourth embodiment is additionally provided in a former stage of the high-speed update part 41 shown in FIG. 6, the high-speed update part 42 shown in FIG. 9, or the LPF processing part 43 shown in FIG. 10.

Referring to a flow chart, the same command sudden change determination step as S120 shown in FIG. 14 is added between S102 and S103 shown in FIG. 8. If it is determined that the added step is affirmative, the procedure proceeds to S103, whereas it is determined that the added step is negative, the procedure proceeds to S104. Further, the same command sudden change determination step as S120 shown in FIG. 14 is added between S102 and S203 shown in FIG. 12. If it is determined that the added step is affirmative, the procedure proceeds to S203, whereas it is determined that the added step is negative, the procedure proceeds to S104.

(C) As to the high-speed update of the d-axis current command value id* and the q-axis current command value iq* in the first embodiment and the second embodiment, in the embodiments described above, the d-axis high-speed update command value id*_fst and the q-axis high-speed update command value iq*_fst are updated in the sensor phase current sensing cycle Cs that is the operation cycle of the control section 15. In the other embodiment, the high-speed update cycle that is the update cycle of the high-speed update command value may be a cycle of any length, if the cycle is shorter than the update cycle of the current command value. In this regard, the high-speed update cycle does not need to be made shorter than the sensor phase current sensing cycle, so that if it is assumed that: the command update cycle is Cd; the sensor phase current sensing cycle is Cs; and the high-speed update cycle is Ch, it is preferable that the high-speed update cycle Ch ranges within a range of Cs Ch<Cd.

Further, as to the high-speed update of the current command value, in some cases, various operations are performed for the current command value according to the state of the vehicle and the AC motor. Performing the various operations in a high-speed update cycle can also produce the same effects as those produced by updating the current command value at high speeds. In other words, "making an operation cycle relating to the current command value a high-speed update cycle" is included in the concept of "updating a current command value in a high-speed update cycle shorter than the command update cycle".

Still further, the same effect can be produced even by updating a higher command value used for calculating the current command value such as the torque command value at high speeds. A method for updating a higher command value of the current command value of the torque command value or the like includes a linear interpolation method or a finely dividing method. That is, "the current command value change device may update a higher command value used for calculating the current command value in a high-speed update cycle shorter than a command update cycle". Further, the same effect can be produced even by performing various operations performed for a higher command value in a high-speed update cycle according to the state of the vehicle and the AC motor. In other words, "making the operation relating to a higher command value a high-speed update cycle" is included in the concept of "updating a higher command value in a high-speed update cycle shorter than the command update cycle".

(D) In the embodiments described above, the operation cycle of the voltage command value is equal to the sensor phase current sensing cycle. In the other embodiment, if it is assumed that: the operation cycle of the voltage command value is Cv; the sensor phase current sensing cycle is Cs; and the command update cycle is Cd, the operation cycle Cv of the voltage command value can be arbitrarily set within a range of Cs≤Cv≤Cd. That is, it is not always necessary "for the voltage command value operation device to operate the voltage command value in a cycle equal to the sensor phase current sensing cycle", like the embodiments described above, but it may be employed "for the voltage command value operation device to operate the voltage command value in a cycle equal to the command update cycle" or "for the voltage command value operation device to operate the voltage command value in a cycle longer than the sensor phase current sensing cycle and shorter than command update cycle".

The same effects as those produced by the embodiments described above can be produced not by the update cycle of the voltage command value but by the sudden change prevention device.

Here, mention will be made of the case where the operation cycle of the current command value is equal to the command update cycle, that is, Cv=Cd. Depending on the type or construction of control, the operation of the current command value is performed in a long cycle equal to the command update cycle in some cases. That is, the interval of the update of the voltage command value becomes longer than the sensor phase current sensing cycle. For example, when the update cycle of the current command value used for the operation of the current estimated value is made equal to the sensor phase current sensing cycle, like the first embodiment described above, the difference between the current estimated value and the current sensed value becomes smaller for each of the sensor phase current sensing cycle. For this reason, even if the current estimated value is fed back to the operation of the voltage command value operated in a longer cycle, a variation can be reduced at an operation timing of the voltage command value, which hence can produce the same effects as those produced by the embodiments described above. Of course, this is not limited to the case where if the high-speed update cycle is shorter than the command update cycle, the high-speed update cycle is equal to the sensor phase current sensing cycle.

(E) In the fourth embodiment, the sudden change flag and the gain index are sent to the PI operation part 23 from the command sudden change determination part 45. The other embodiment may be constructed in such a way that only the sudden change flag is sent from the command sudden change determination part and that a feedback gain is changed by the PI operation part.

In this regard, a reduced feedback gain may be uniquely determined, or may be changed stepwise according to a variation range of an axis current command value, or may be calculated by the use of a mathematical formula, a map, or the like.

(F) Similarly, in the fifth embodiment, the sudden change flag and the amount of limit of variation range are sent to the voltage command value limitation part 47 from the command sudden change determination part. The other embodiment may be constructed in such a way that only the sudden change flag is sent from the command sudden change determination part 46 and that the amount of limit of variation range is determined by the voltage command limitation part.

In this regard, the amount of limit of variation range may be uniquely determined, or may be changed stepwise according to the variation range of the current command value, or may be calculated by the use of a mathematical formula, a map, or the like.

(G) In the embodiments described above, the sudden change determination is made on the basis of the difference between the value of the last time and the value of this time (degree of change) of each of the d-axis current command value id* and the q-axis current command value iq*. In the other embodiment, the sudden change determination may be made on the basis of degree of change of a higher command of the current command value, for example, like the torque command value sent from the vehicle control circuit.

(H) In the embodiments described above, "current command value", "current estimated value", and "voltage command value" on the d axis and the q axis have been described, but those may be based on the respective phase currents and the other axes. Further, if the current estimated value is calculated by a method based on at least the sensor phase current sensed value, the rotation angle sensed value, and the current command value, the current estimated value may be calculated by any method and further may be calculated by the use of other parameters. Still further, if the voltage command value is calculated on the basis of at least the current command value and the current estimated value fed back, the voltage command value may be calculated by any method and further may be calculated the use of other parameters.

(I) The sensor phase for sensing a phase current by the current sensor is not limited to the W phase of the embodiment described above but may be the U phase or the V phase. Further, the estimation phase for calculating the current estimated value from the current sensed value of the sensor phase and the sensor phase basic current phase is not limited to the U phase of the embodiment described above but may be the V phase or the W phase.

(J) For the purpose of preventing dq transformation from not holding because the number of phases for which a current sensed value is acquired is only one, the embodiments described above employ a method for estimating the current of the other phase to thereby make the dq transformation hold. In the other embodiment, a device for making the dq transformation hold on the basis of the current sensed value of one phase is not limited to this method but, for example, a dq transformation formula that holds even for the current sensed value of only one phase may be newly created for the purpose. However, as the result of the research of the inventor, it is found that both methods produce the same result in a mathematical representation. In this regard, in the case where a dq transformation formula that holds for the current sensed value of only one phase is newly created, for example, the step of outputting a current estimated value, as shown by S104 in FIG. 8, is omitted, but it should be understood that the concept of estimating a current estimated value is included in the process of deriving a new dq transformation formula that holds for a current sensed value of only one phase, In other words, it is assumed that the use of the newly derived dq transformation formula includes the concept of using a current estimated value.

(K) The zero crossing interpolation method in the zero crossing interpolation part may be a method other than the method described in the embodiments described above, or the zero crossing interpolation may be not performed as required.

In this regard, as to "the zero division", for the purpose of preventing an estimated value from being calculated at an unintentional value by the effect of the discrete system in the equation (13), a limit value may be set for the estimation coefficient iu_kp or the term of $\{1/\tan(\theta x)\}$ in the estimation coefficient iu_kp. Further, in the case where the equation (13) is mounted in the control section 15, as described above, it is effective to express the estimation coefficient iu_kp or the term of $\{1/\tan(\theta x)\}$ in the estimation coefficient iu_kp in a map, and in this case, a limit value is set for the map.

(L) In the embodiments described above, the inverter for controlling the voltage to be impressed on the AC motor is controlled by the PWM control. However, in the other embodiment, any method of controlling the voltage on the basis of a current command value can be employed. Further, the sine wave PWM control mode and the overmodulation PWM control mode are not limited to the construction of the embodiments described above, but any control method of using a current command value and of feeding back a current sensed value and a current estimated value based on the current sensed value to the current command value may be employed.

(M) In the embodiments described above, the AC motor is a three-phase permanent magnet type synchronous motor, but in the other embodiment, an induction motor or the other synchronous motor may be used for the AC motor. Further, the AC motor in the embodiment described above is a so-called motor generator having both of a function as an electric motor and a function as a generator, but in the other embodiment, an AC motor may be an electric motor not having the function as the generator.

An AC motor may be constructed in such a way as to operate as an electric motor for an engine and to start the engine. Further, the engine may be not provided. Still further, a plurality of AC motors may be provided and a power dividing mechanism for dividing power in the plurality of AC motors may be further provided.

(N) The control device of the AC motor according to the present invention may be applied not only to a system having one set of inverter and AC motor, as described in the embodiments, but also to a system having two or more sets of inverters and AC motors. Further, the control device of the AC motor according to the present invention may be applied to a system of an electric train having a plurality of AC motors connected in parallel to one inverter.

Still further, the control device of the AC motor is applied to the electric vehicle but may be applied to an object other than the electric vehicle.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device for controlling a driving state of a three-phase alternating current motor, in which a voltage to be applied to the motor is controlled by an inverter, the control device comprising:
   a current acquisition device for acquiring a sensor phase current sensed value in a sensor phase current sensing cycle from a current sensor disposed in a sensor phase, which is one of three phases of the alternating current motor;
   a rotation angle acquisition device for acquiring a rotation angle sensed value from a rotation angle sensor for sensing a rotation angle of the alternating current motor;
   a current command value operation device for updating a current command value relating to the driving state of the alternating current motor in a command update cycle, which is longer than the sensor phase current sensing cycle;
   a current estimation device for calculating a current estimated value according to the sensor phase current sensed value, the rotation angle sensed value, and the current command value;
   a voltage command value operation device for calculating a voltage command value according to the current command value and the current estimated value that is fed back;
   a drive signal generation device for generating a drive signal relating to a driving state of the inverter according to the voltage command value; and
   a sudden change prevention device for preventing the voltage command value from a sudden change according to a sudden change in the current estimated value that is fed back,
   wherein the sudden change of the current estimated value is caused by a sudden change in the current command value,
   wherein the sudden change of the voltage command value is defined by a change period equal to or shorter than a predetermined time interval, and a change amount equal to or larger than a predetermined change amount,
   wherein the sudden change of the current estimated value is defined by a change period equal to or shorter than a predetermined time interval, and a change amount equal to or larger than a predetermined change amount, and
   wherein the sudden change in the current command value is defined by a change period equal to or shorter than a predetermined time interval, and a change amount equal to or larger than a predetermined change amount.

2. The control device of an alternating current motor according to claim 1, wherein the sudden change prevention device includes a current command value change device for changing the current command value, which is used in the current estimation device.

3. The control device of an alternating current motor according to claim 2,
wherein the current command value change device updates the current command value in a high-speed update cycle, which is shorter than the command update cycle.

4. The control device of an alternating current motor according to claim 3,
wherein the high-speed update cycle is equal to the sensor phase current sensing cycle.

5. The control device of an alternating current motor according to claim 3,
wherein the voltage command value operation device operates the voltage command value according to the current command value updated in the high-speed update cycle.

6. The control device of an alternating current motor according to claim 2,
wherein the current command value change device executes a low-pass filter processing of the current command value.

7. The control device of an alternating current motor according to claim 1, further comprising:
a sudden change determination device for determining whether the current command value is suddenly changed,
wherein, when the sudden change determination device determines that the current command value is suddenly changed, the sudden change prevention device reduces a feedback gain of the current estimated value, which is used in an operation of the voltage command value operation device.

8. The control device of an alternating current motor according to claim 1, further comprising:
a sudden change determination device for determining whether the current command value is suddenly changed,
wherein, when the sudden change determination device determines that the current command value is suddenly changed, the sudden change prevention device directly limits a variation range of the voltage command value.

* * * * *